United States Patent
Mackey et al.

(10) Patent No.: US 10,047,965 B2
(45) Date of Patent: Aug. 14, 2018

(54) SYSTEM FOR MANAGING LUBRICANT LEVELS IN TANDEM COMPRESSOR ASSEMBLIES OF AN HVAC SYSTEM

(71) Applicant: Lennox Industries Inc., Richardson, TX (US)

(72) Inventors: David Mackey, Addison, TX (US); Der-Kai Hung, Dallas, TX (US); Aylan Him, Coppell, TX (US); Hong Lin, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 350 days.

(21) Appl. No.: 14/860,274

(22) Filed: Sep. 21, 2015

(65) Prior Publication Data

US 2016/0010885 A1 Jan. 14, 2016

Related U.S. Application Data

(63) Continuation-in-part of application No. 14/293,099, filed on Jun. 2, 2014, now Pat. No. 9,488,400.

(51) Int. Cl.
*F25B 31/00* (2006.01)
*F25B 49/02* (2006.01)
(Continued)

(52) U.S. Cl.
CPC .............. *F24F 7/007* (2013.01); *F17D 3/00* (2013.01); *F25B 31/004* (2013.01);
(Continued)

(58) Field of Classification Search
CPC .. F25B 31/004; F25B 49/022; F25B 2400/06; F25B 2400/061; F25B 2400/075;
(Continued)

(56) References Cited

U.S. PATENT DOCUMENTS

| 4,506,516 A | 3/1985 | Lord |
| 2006/0086103 A1 | 4/2006 | Lee |

(Continued)

FOREIGN PATENT DOCUMENTS

EP 2960600 12/2015

OTHER PUBLICATIONS

European Patent Office, Communication pursuant to Article 94(3) EPC, Application No. 15 169 821.4-1602, Ref. JL78139P.EPP, dated Apr. 19, 2017, 3 pages.

(Continued)

*Primary Examiner* — Marc Norman
(74) *Attorney, Agent, or Firm* — Baker Botts L.L.P.

(57) ABSTRACT

A heating, ventilation, and air-conditioning (HVAC) system comprises a plurality of sensors, a plurality of tandem compressor assemblies that each comprise a first compressor and a second compressor, and a controller communicatively coupled to the plurality of sensors and the plurality of tandem compressor assemblies. The controller determines an increase in a cooling demand of a structure associated with the HVAC system based on data received from at least one of the plurality of sensors. Also, the controller compares an ambient temperature outside of the structure to a first threshold. In response to determining that the ambient temperature is greater than the first threshold, the controller operates the HVAC system in a first mode and in response to determining that the ambient temperature is less than the first threshold, the controller operates the HVAC system in a second mode.

16 Claims, 22 Drawing Sheets

(51) Int. Cl.
*F24F 7/007* (2006.01)
*F17D 3/00* (2006.01)

(52) U.S. Cl.
CPC ...... *F25B 49/022* (2013.01); *F25B 2400/061* (2013.01); *F25B 2400/0751* (2013.01); *F25B 2500/16* (2013.01); *F25B 2500/18* (2013.01); *F25B 2600/01* (2013.01); *F25B 2600/0251* (2013.01); *F25B 2600/0253* (2013.01); *F25B 2600/23* (2013.01); *F25B 2700/03* (2013.01); *F25B 2700/1933* (2013.01); *F25B 2700/2105* (2013.01); *F25B 2700/2106* (2013.01); *Y02B 30/741* (2013.01)

(58) Field of Classification Search
CPC .......... F25B 2400/0751; F25B 2500/16; F25B 2500/18; F25B 2600/0251; F25B 2600/0353; F25B 2700/03; F25B 2700/1933; F25B 2700/2105; F25B 2700/2106; Y02B 30/741; F24D 7/007
See application file for complete search history.

(56) References Cited

U.S. PATENT DOCUMENTS

| | | |
|---|---|---|
| 2009/0084120 A1 | 4/2009 | Meier et al. |
| 2010/0186433 A1 | 7/2010 | Galante |
| 2013/0098088 A1* | 4/2013 | Lin ........................ F25B 49/02 62/228.1 |
| 2014/0137585 A1 | 5/2014 | Lu |

OTHER PUBLICATIONS

European Patent Office, Communication for Application No. 15169821.4-1602 5 pages, dated Nov. 29, 2015.

Aylan Him et al., U.S. Appl. No. 14/293,099, Non-provisional Patent Application entitled, "System for Managing Lubricant Levels in Tandem Compressor Assemblies of an HVAC System", filed Jun. 2, 2014, 54 pages.

European Patent Office, Extended European Search Report, Appln. No. 16188785.6-1602, Reference JL85529P.EPP, dated Feb. 23, 2017.

\* cited by examiner

| Stage | Compressor Assembly | | | |
|---|---|---|---|---|
| | Tandem Assembly 1 | | Tandem Assembly 2 | |
| | C1 | C2 | C3 | C4 |
| Y1 | ON | OFF | ON | OFF |
| T₁ | OFF | OFF | ON | OFF |
| T₂ | ON | ON | OFF | OFF |
| Y2 | ON | ON | ON | ON |

FIG. 9A

| Demand Stage | Compressor Assembly | | | |
|---|---|---|---|---|
| | Tandem Assembly 1 | | Tandem Assembly 2 | |
| | C1 | C2 | C3 | C4 |
| Y0 | OFF | OFF | OFF | OFF |
| Y1 | ON | ON | OFF | OFF |
| Y2 | ON | ON | ON | ON |

FIG. 9B

| Demand Stage | Compressor Assembly |||||
|---|---|---|---|---|
| | Tandem Assembly 1 || Tandem Assembly 2 ||
| | C1 | C2 | C3 | C4 |
| Y1 | ON | OFF | OFF | OFF |
| Y2 | OFF | OFF | ON | ON |
| Y3 | ON | ON | ON | ON |
| Y4 | ON | ON | ON | ON |

FIG. 9D

| Stage | Compressor Assembly ||||
|---|---|---|---|---|
| | Tandem Assembly 1 || Tandem Assembly 2 ||
| | C1 | C2 | C3 | C4 |
| Y1 | ON | OFF | OFF | OFF |
| Y2 | ON | OFF | ON | OFF |
| T₁ | OFF | OFF | ON | OFF |
| Y3 | ON | ON | ON | OFF |
| T₂ | ON | ON | OFF | OFF |
| Y4 | ON | ON | ON | ON |

FIG. 9C

| Demand Stage | Compressor Assembly | | |
|---|---|---|---|
| | Tandem Assembly 1 | | 2-Speed |
| | C1 | C2 | C3 |
| Y1 | ON | OFF | LOW |
| T3 | OFF | OFF | HIGH |
| Y2 | ON | ON | HIGH |

FIG. 10A

| Demand Stage | Compressor Assembly | | |
|---|---|---|---|
| | Tandem Assembly 1 | | 2-Speed |
| | C1 | C2 | C3 |
| Y0 | OFF | OFF | OFF |
| Y1 | ON | ON | OFF |
| Y2 | ON | ON | HIGH |

FIG. 10B

| Stage | Compressor Assembly | | |
|---|---|---|---|
| | Tandem Assembly 1 | | 2-Speed |
| | C1 | C2 | C3 |
| Y1 | OFF | OFF | LOW |
| Y2 | ON | OFF | OFF |
| Y3 | ON | OFF | LOW |
| T3 | OFF | OFF | HIGH |
| Y4 | ON | ON | HIGH |

FIG. 10C

| Stage | Compressor Assembly | | |
|---|---|---|---|
| | Tandem Assembly 1 | | 2-Speed |
| | C1 | C2 | C3 |
| Y1 | OFF | OFF | LOW |
| Y2 | OFF | OFF | HIGH |
| Y3 | ON | ON | OFF |
| Y4 | ON | ON | HIGH |

FIG. 10D

| COOLING DEMAND | COMPRESSOR | | | | | |
|---|---|---|---|---|---|---|
| | CIR 1 | | CIR 2 | | CIR 3 | |
| | 1 | 2 | 3 | 4 | 5 | 6 |
| Y1 | ON | OFF | OFF | OFF | OFF | OFF |
| Y2 | ON | OFF | ON | OFF | OFF | OFF |
| Y3 | ON | OFF | OFF | OFF | ON | ON |
| Y4 | OFF | OFF | ON | ON | ON | ON |
| Y5 | ON | ON | ON | ON | ON | ON |
| Y6 | ON | ON | ON | ON | ON | ON |

*FIG. 14A*

| COOLING DEMAND | COMPRESSOR | | | | | |
|---|---|---|---|---|---|---|
| | CIR 1 | | CIR 2 | | CIR 3 | |
| | 1 | 2 | 3 | 4 | 5 | 6 |
| Y1 | ON | OFF | OFF | OFF | OFF | OFF |
| Y2 | ON | OFF | ON | OFF | OFF | OFF |
| Y3 | ON | OFF | ON | OFF | ON | OFF |
| Y4 | ON | ON | ON | OFF | ON | OFF |
| Y5 | ON | ON | ON | ON | ON | OFF |
| Y6 | ON | ON | ON | ON | ON | ON |

*FIG. 14B*

| COOLING DEMAND | COMPRESSOR | | | | | |
|---|---|---|---|---|---|---|
| | CIR 1 | | CIR 2 | | CIR 3 | |
| | 1 | 2 | 3 | 4 | 5 | 6 |
| Y1 | ON | OFF | OFF | OFF | OFF | OFF |
| Y2 | ON | OFF | ON | OFF | OFF | OFF |
| Y3 | ON | OFF | ON | OFF | ON | OFF |
| Y3* | OFF | OFF | ON | OFF | ON | OFF |
| Y4 | ON | ON | ON | OFF | ON | OFF |
| Y4* | ON | ON | OFF | OFF | ON | OFF |
| Y5 | ON | ON | ON | ON | ON | OFF |
| Y5* | ON | ON | ON | ON | OFF | OFF |
| Y6 | ON | ON | ON | ON | ON | ON |

*FIG. 14C*

| COOLING DEMAND | COMPRESSOR | | | | | | |
|---|---|---|---|---|---|---|---|
| | CIR 1 | | CIR 2 | | CIR 3 | | AUXILARY |
| | 1 | 2 | 3 | 4 | 5 | 6 | 7 |
| Y1 | ON | OFF | OFF | OFF | OFF | OFF | OFF |
| Y2 | ON | OFF | ON | OFF | OFF | OFF | OFF |
| Y3 | ON | OFF | ON | OFF | ON | OFF | OFF |
| Y3* | OFF | OFF | ON | OFF | ON | OFF | ON |
| Y4 | ON | ON | ON | OFF | ON | OFF | OFF |
| Y4* | ON | ON | OFF | OFF | ON | OFF | ON |
| Y5 | ON | ON | ON | ON | ON | OFF | OFF |
| Y5* | ON | ON | ON | ON | OFF | OFF | ON |
| Y6 | ON | ON | ON | ON | ON | ON | OFF |
| Y7 | ON | ON | ON | ON | ON | ON | ON |

*FIG. 14D*

SYSTEM FOR MANAGING LUBRICANT LEVELS IN TANDEM COMPRESSOR ASSEMBLIES OF AN HVAC SYSTEM

RELATED APPLICATION

This application is a continuation-in-part of U.S. Non-Provisional patent application Ser. No. 14/293,099, filed Jun. 2, 2014 and entitled "System for Managing Lubricant Levels in Tandem Compressor Assemblies of an HVAC System," which is hereby incorporated by reference in its entirety.

TECHNICAL FIELD

This disclosure relates generally to compressors used in heating, ventilation, and air conditioning (HVAC) systems and, more particularly, to a system for managing lubricant levels in tandem compressor assemblies of an HVAC system.

BACKGROUND

Some heating, ventilation, and air conditioning (HVAC) systems utilize multi-compressor assemblies, such as tandem assemblies. The compressors of a tandem assembly can be manifolded together allowing them to work simultaneously on the same heating or cooling circuit to deliver pressurized refrigerant to the HVAC system. In some manifold configurations, oil used as a lubricant in the HVAC system is equalized between the compressors of the tandem assembly by an oil equalization system, such as piping between each compressor that maintains an equal oil level in the oil sumps. When both compressors of the tandem assembly are operating, the oil equalization system ensures that oil is transferred between the compressors to prevent starving or overfilling of any one compressor, or other problems.

SUMMARY

In one embodiment, a heating, ventilation, and air-conditioning (HVAC) system comprises a plurality of sensors, a plurality of tandem compressor assemblies that each comprise a first compressor and a second compressor, and a controller communicatively coupled to the plurality of sensors and the plurality of tandem compressor assemblies. The controller determines an increase in a cooling demand of a structure associated with the HVAC system based on data received from at least one of the plurality of sensors. Also, the controller compares an ambient temperature outside of the structure to a first threshold. In response to determining that the ambient temperature is greater than the first threshold, the controller operates the HVAC system in a first mode and in response to determining that the ambient temperature is less than the first threshold, the controller operates the HVAC system in a second mode.

Certain embodiments of the present disclosure may provide one or more technical advantages. For example, by using ambient temperature and compressor sump superheat when turning on individual compressors in a tandem compressor assembly, the system can maximize unit efficiency in favorable conditions while protecting an idle compressor from operating in colder conditions in order to maximize the compressor life. As another example, when the ambient temperature is below a threshold and the compressor sump superheat is also below a different threshold, the HVAC system prevents a compressor from turning on if the compressor of the same circuit is already running. This reduces the likelihood of damage or failure in the idle compressor and allows the system to operate in a reliable way.

Certain embodiments of the disclosure may include none, some, or all of the above technical advantages. One or more other technical advantages may be readily apparent to one skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present invention and the advantages thereof, reference is now made to the following Detailed Description taken in conjunction with the accompanying drawings, in which:

FIGS. 9A, 9B, 9C, and 9D are tables showing compressor switching operations of a two-stage and a four-stage HVAC system having dual tandem assemblies;

FIGS. 10A, 10B, 10C, and 10D are tables showing compressor switching operations of a two-stage and a four-stage HVAC system having a tandem compressor assembly operating in conjunction with a single 2-speed compressor;

FIGS. 14A, 14B, 14C, and 14D are tables showing compressor switching operations of a six-stage and seven-stage HVAC system having a tandem compressor assembly.

DETAILED DESCRIPTION OF THE DRAWINGS

When one compressor of a tandem assembly is turned off and the other is running, however, refrigerant will likely condense in the oil sump of the idle compressor. Collection of liquid refrigerant in the oil sump dilutes the oil available to the idle compressor, and can cause compressor problems and even failures, when the idle compressor is turned back on. By operating the tandem compressors in two different modes based on the ambient temperature of air, lubricant management systems and methods improve the reliability and efficiency of compressor assemblies, reducing down time for maintenance and repair, and extending the life of the assembly. By using a plurality of available tandem compressors such that no part load tandem compressor switches up to a full load, reduces the likelihood of damage or failure of one or more of the tandem compressors.

First HVAC System 1000

Figure 1:
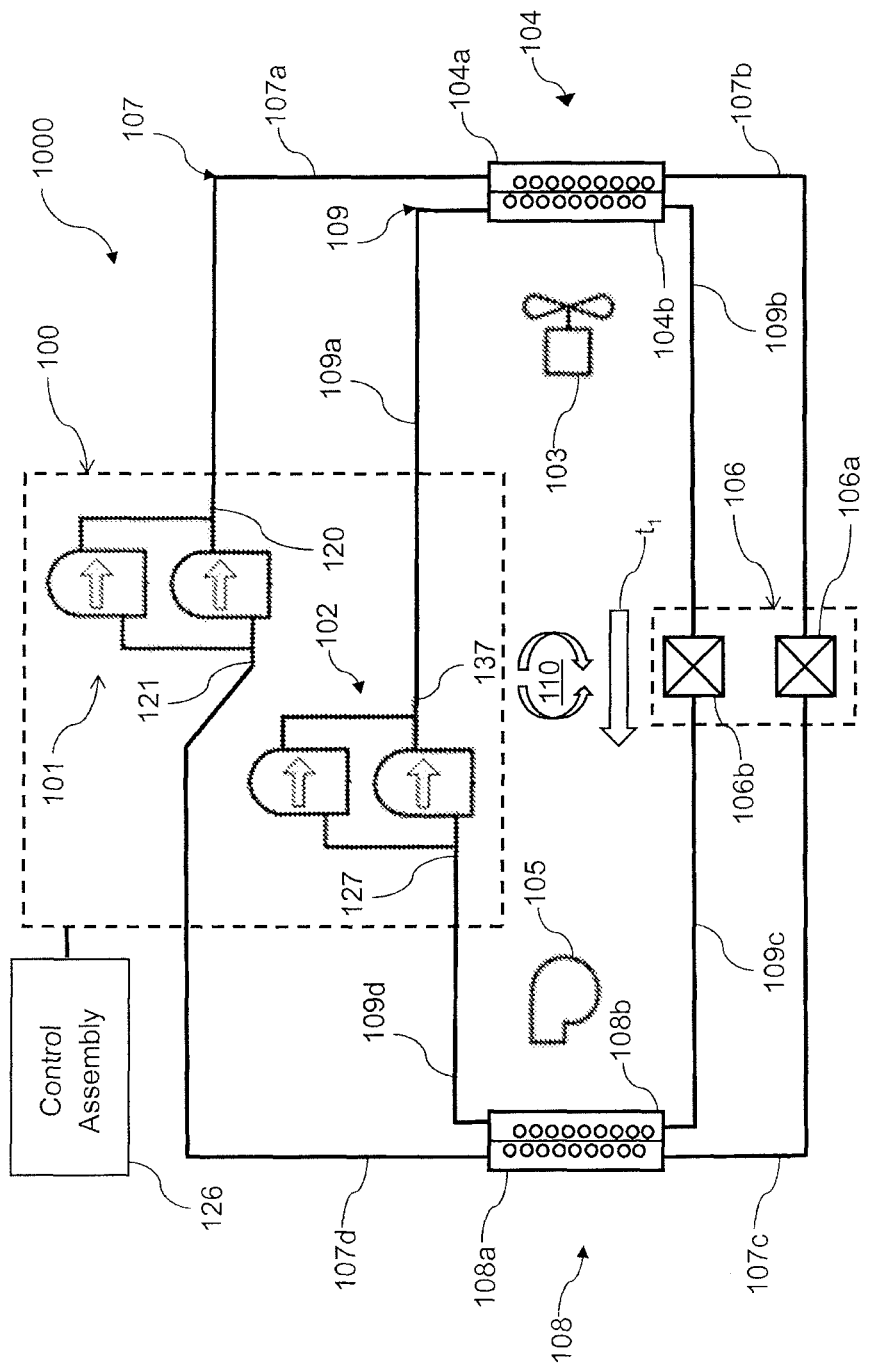
FIG. 1 illustrates a first HVAC system having a first and second compressor assembly.

Referring to FIG. 1, a refrigerant compressor assembly 100 may be configured to operate in a first heating, ventilation, and air conditioning (HVAC) system 1000. The refrigerant compressor assembly 100 may comprise at least one tandem compressor assembly and at least one other compressor assembly. In the embodiments shown in FIGS. 1 and 2, the refrigerant compressor assembly 100 comprises a first compressor assembly 101, shown as a tandem compressor assembly, and a second compressor assembly 102, also shown as a tandem compressor assembly. In certain embodiments, second compressor assembly 102 may be an auxiliary compressor (i.e., a single-circuit compressor). In some embodiments, an auxiliary compressor may be part of compressor assembly 100 in addition to first compressor assembly 101 and second compressor assembly 102.

The refrigerant compressor assembly 100 may drive refrigerant, as a first heat transfer media, in direction t1 through one or more flow line circuits containing heat transfer devices, e.g. condensers and evaporators. In the embodiment shown, a first flow line circuit 107, shown in segments 107a-d, may connect the first compressor assembly 101 to a first condenser portion 104a of a condenser 104, to a first expansion valve device 106a of an expansion assembly 106, and to a first evaporator portion 108a of an evaporator 108. A second flow line circuit 109, shown in segments 109a-d, may connect the second compressor assembly 102 to a second condenser portion 104b of the condenser 104, to a second expansion valve device 106b of the expansion assembly 106, and to a second evaporator portion 108b of the evaporator 108.

The condenser 104 and the evaporator 108 may comprise coils containing channels for the transfer of thermal energy between refrigerant flowing in the channels and the environment surrounding the coils. Each condenser 104 and evaporator 108 may be divided into the portions 104a, 104b and 108a, and 108b, respectively. Each portion of the condenser 104 and the evaporator 108 may be dedicated to one of the first compressor assembly 101 or the second compressor assembly 102 so that in some configurations only one portion of the evaporator 108 and the condenser 104 may be utilized in a cooling or heating cycle. It will be understood by persons of ordinary skill in the art that the portions of the condenser 104 or the evaporator 108 may comprise parts of the same integrated structure (e.g. one condenser with partitioned portions) or may comprise two separate structures that may be located in different physical locations (e.g. two condensers separately located).

Referring to FIG. 1, a control assembly 126 may be operationally connected to the refrigerant compressor assembly 100 to control operation of the first compressor assembly 101 and the second compressor assembly 102. Other operations of the control assembly 126 may include, but not be limited to, sensing and measuring environmental data, receiving system data, to make calculations based on environmental and system data, reporting the status of the system, issuing commands based on timing functions, timers and clocks, and other operations readily apparent to persons of ordinary skill in the art.

The first HVAC system 1000 may utilize a second heat transfer media in the cooling and heating cycle 110. In some embodiments, the second heat transfer media is air. Air may be pumped or blown by fluid moving devices, such as fan 103 and blower 105, over the coils of the condenser 104 and the evaporator 108, respectively, to facilitate the transfer of thermal energy between the refrigerant flowing in the channels and the environment surrounding the respective heat transfer device. The first HVAC system 1000 may be configured for refrigeration, cooling, and heating in the cooling or heating cycle 110 for maintaining a desired temperature profile in an enclosed space, such as a residential or commercial structure.

First Compressor Assembly 101 and Second Compressor Assembly 102

Figure 2:
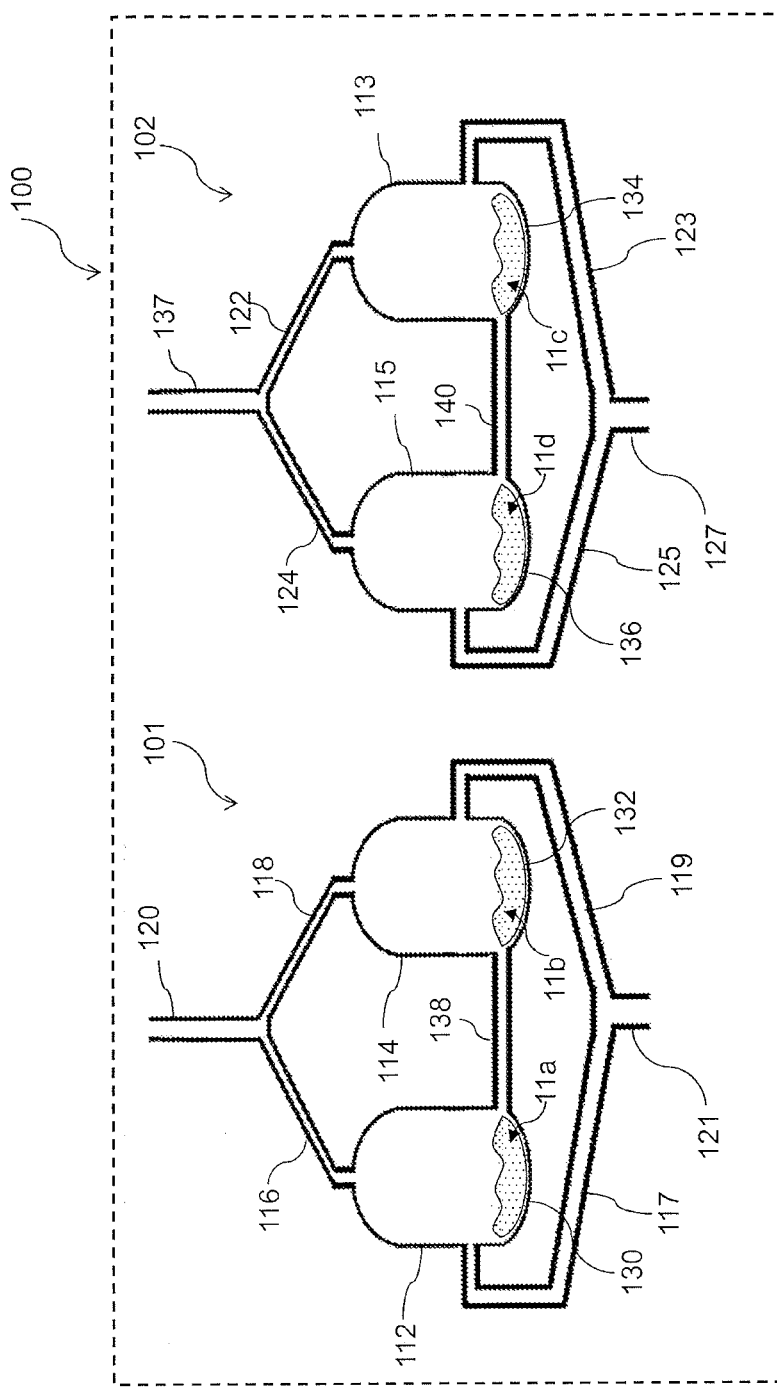
FIG. 2 shows a schematic of the first and second compressor assembly illustrated in FIG. 1.

Referring to FIGS. 1 and 2, each of the first compressor assembly 101 and the second compressor assembly 102 of the refrigerant compressor assembly 100 may comprise one or more compressor units. The first compressor assembly 101 may comprise a first compressor 112 and a second compressor 114 operationally connected in tandem for adjustment of the total heat transfer capacity of the first HVAC system 1000. In some embodiments, the second compressor assembly 102 may comprise a third compressor 113 and a fourth compressor 115 operationally connected in tandem for adjustment of the total heat transfer capacity of the first HVAC system 1000. In other embodiments, the first and second compressor assemblies 101, 102 may comprise two or more compressor units operated in tandem, for example a three compressor system. In still other embodiments, the second compressor assembly 102 may comprise a single compressor assembly, for example a two-speed compressor.

Each compressor of the first compressor assembly 101 and the second compressor assembly 102 may comprise the same or a different total capacity as compared to the other compressors. Each compressor of the first compressor assembly 101 and the second compressor assembly 102 may comprise a fixed capacity (i.e. one speed), a variable capacity, or a staged capacity (e.g. a two-stage capacity).

Referring to FIGS. 1 and 2, the first compressor 112 and the second compressor 114 of the first compressor assembly 101 may be manifolded together such that the compressors 112, 114 share one or more portions of flow line segments 107a-d in the same heating or cooling cycle 110. By example, a first discharge line 116 of the first compressor 112 and a second discharge line 118 of the second compressor 114 may be connected by a first common discharge line 120. A first suction line 117 of the first compressor 112 and a second suction line 119 of the second compressor 114 may be connected by a first common suction line 121. Refrigerant pumped into the first compressor 112 via the first suction line 117 and the second compressor 114 via the second suction line 119 from the common suction line 121 may flow out from each respective discharge line 116, 118 into the first common discharge line 120.

In some embodiments, the third compressor 113 and the fourth compressor 115 of the second compressor assembly 102 may also be manifolded together in a tandem configuration to share one or more portions of flow line segments 109a-d in the same heating or cooling cycle 110. As shown in FIGS. 1 and 2, discharge lines 122 and 124 of the third and fourth compressors 113 and 115, respectively, are connected by a second common discharge line 137, and suction lines 123 and 125 are connected by a second common suction line 127. Refrigerant pumped into the third compressor 113 and fourth compressor 115 via their respective suction lines 123, 125 from the second common suction line 127 may flow out from each respective discharge line 122, 124 into the second common discharge line 137

Referring to FIG. 1, the first common suction line 121 of the first compressor assembly 101 is configured to receive refrigerant flow from flow line segment 107d. Refrigerant is then pumped by the first compressor assembly 101 through the first common discharge line 120, which is configured to transfer refrigerant flow to the flow line segment 107a.

Referring again to FIG. 1, the second common suction line 127 of the second compressor assembly 102 is configured to receive refrigerant flow from flow line segment 109d. Refrigerant is then pumped by the second compressor assembly 102 through the second common discharge line 137, which is configured to transfer refrigerant flow to the flow line segment 109a.

Referring to FIG. 2, each of the first compressor 112 and the second compressor 114 may comprise a first compressor sump 130 and a second compressor sump 132, respectively. In some embodiments, the third compressor 113 and the fourth compressor 115 of the second compressor assembly 102 may comprise sumps 134, 136 respectively. Each compressor sump 130, 132, 134, and 136 is configured as a collection vessel for lubricant 11 (shown as 11a-d), e.g. oil, used in the first HVAC system 1000. During periods when one or both of the compressors 112, 114 and 113, 115 of each compressor assembly 101, 102, respectively, are not operating, oil and refrigerant may collect in the compressor sumps 130, 132, 134, and 136 of the compressor(s) that is not operating.

Oil levels may be equalized between the first compressor 112 and the second compressor 114 by a lubricant equalization system. In some embodiments, as shown in FIG. 2, the lubricant equalization system may comprise first tubing 138 that extends between the first compressor 112 and the second compressor 114. The first tubing 138 provides a channel for movement of oil between compressors, which allows the amount of oil in each compressor 112, 114 to equalize between the two compressors. Second tubing 140 shown extending between the third compressor 113 and the fourth compressor 115 may function in a similar manner to the first tubing 138 in allowing oil levels to equalize between the third compressor 113 and the fourth compressor 115.

When one compressor, e.g. the first compressor 112, is running and the other compressor is idle, oil is pulled from the other compressor, e.g. the second compressor 114, into the running compressor. Liquid refrigerant may condense and mix with the oil in the sump of the idle compressor (e.g. sump 132), diluting the oil available to the idle compressor, and reducing the lubricating quality of the oil present in the compressor.

Control Assembly 126

Figure 3:
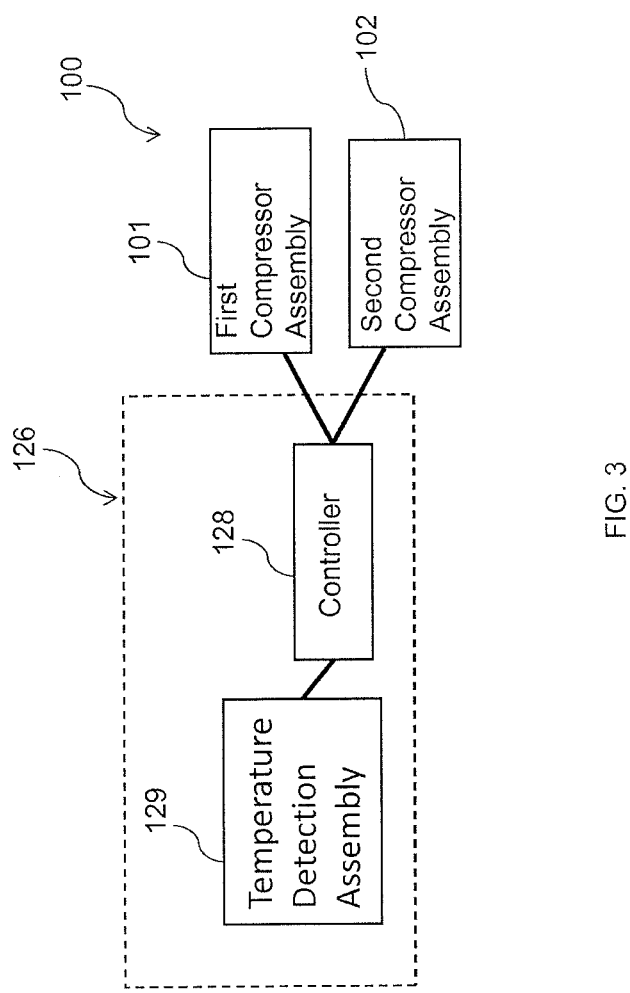
FIG. 3 shows a schematic of a control assembly operationally connected to a first and second compressor assembly.

Referring to FIG. 3, a control assembly 126 may be operationally connected to the refrigerant compressor assembly 100. The control assembly 126 may further comprise a controller 128 operationally connected to the refrigerant compressor assembly 100 configured to control operation of the refrigerant compressor assembly 100.

Referring to FIG. 3, the control assembly 126 may further comprise the controller 128 operationally connected to the temperature detection assembly 129. The temperature detection assembly 129 may be configured to detect the ambient temperature, which is the temperature outside an environmentally controlled space (shown as space 10 in FIG. 4). The controller 128 may be further configured to determine the sump superheat of the first and second compressor assemblies 101, 102 based on the saturated suction temperature and the ambient temperature, which it is assumed is roughly equal to the temperature of the sump of an idle compressor.

Figure 4:
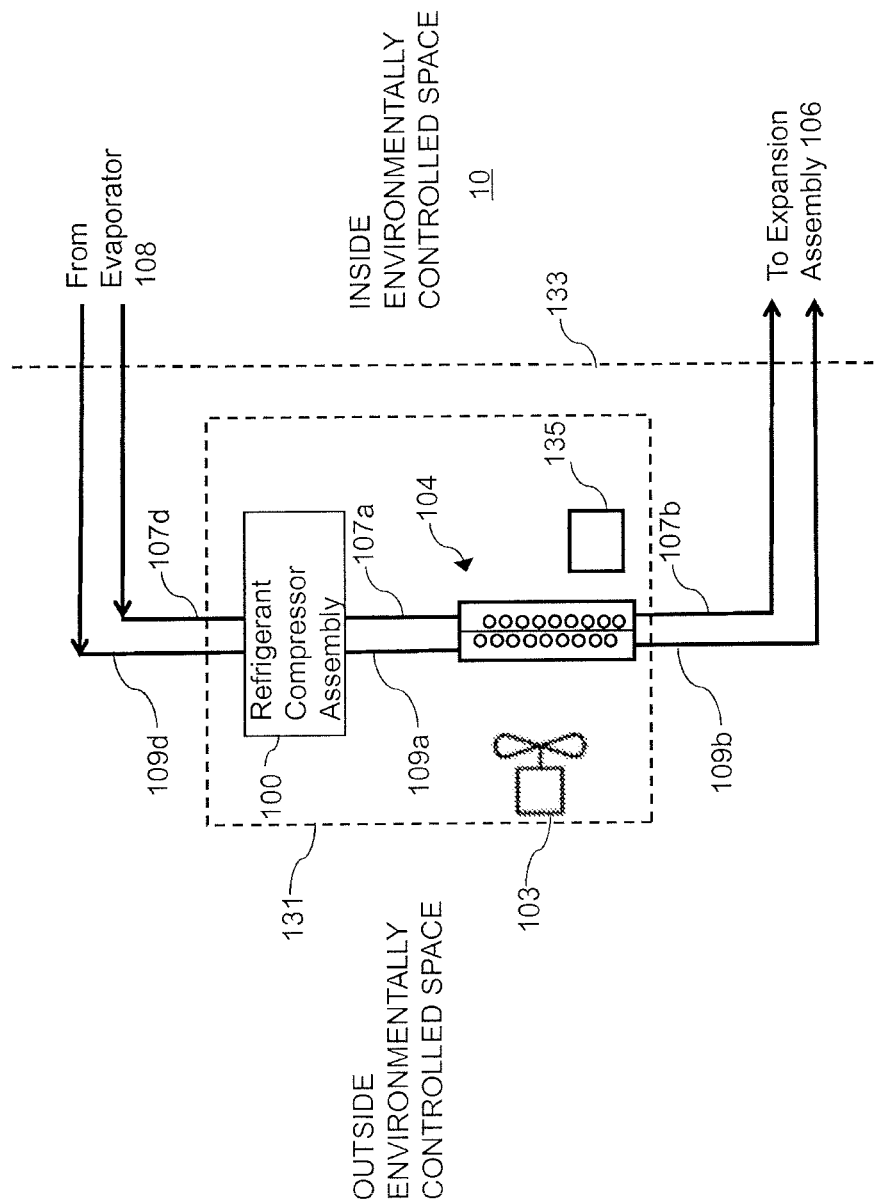
FIG. 4 shows a portion of an HVAC system relative to an environmentally controlled space.

Referring to FIGS. 3 and 4, in some embodiments, the temperature detection assembly 129 may comprise a temperature detection device, such as a thermostat 135. The thermostat 135 may comprise a component of an outside unit 131. In other embodiments, the temperature detection device may comprise a digital sensor from part of a direct digital control (DDC) system, a zone sensor or other device configured to detect the ambient temperature. In some embodiments, the sump superheat may be more accurately determined by adding a pressure transducer to the suction line of the idle compressor to measure suction pressure and measuring the temperature of the sump by direct measurement with for example a thermostat mounted on or near the sump.

In some embodiments, as shown in FIG. 4, the outside unit 131 comprises the compressor assembly 100 and the condenser 104, which is configured to receive flow of a second heat transfer media (e.g. air) from the fan assembly 103. The outside unit 131 may be positioned outside of the walls 133 of the environmentally controlled space 10 to facilitate the transfer of heat between inside and outside the space 10 via refrigerant flow lines (e.g. flow line segments 107b, 107d and 109b, 109d).

Mode Transition Temperature

Figure 5A:
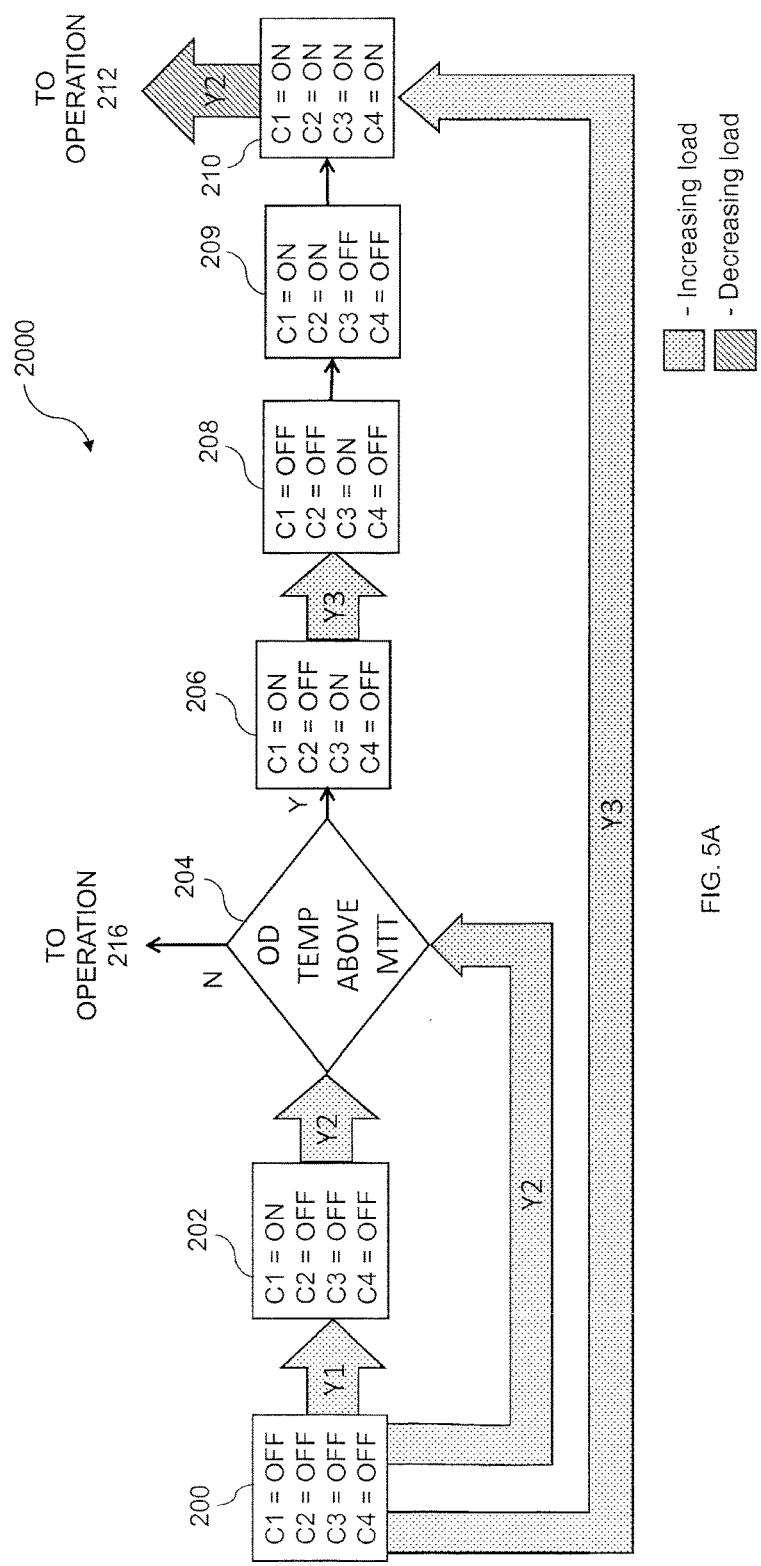
FIGS. 5A, 5B, and 5C show a flow chart of operations of a first method for managing lubricant levels in a multi-compressor assembly in an HVAC system.
Figure 5B:
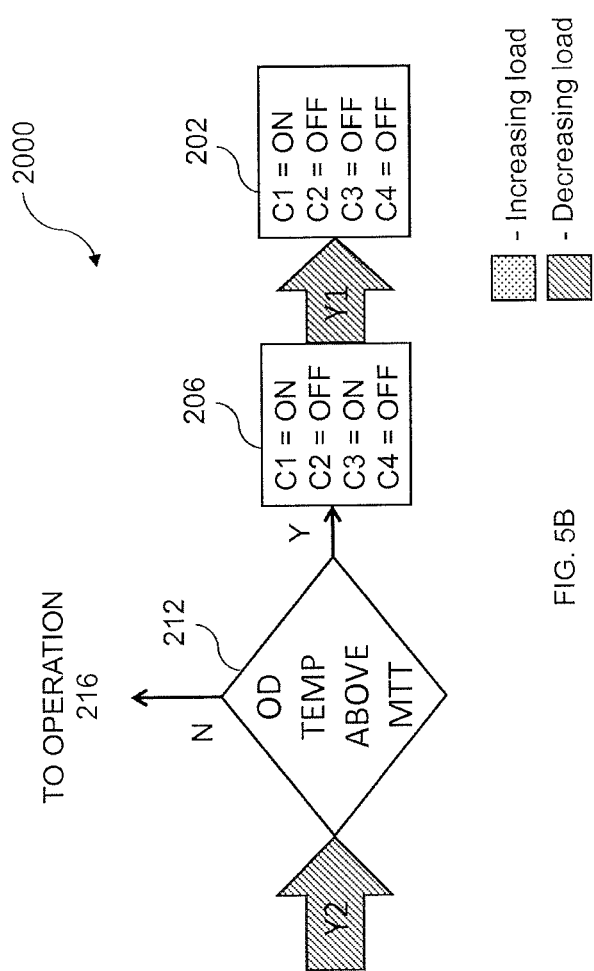
Figure 5C:
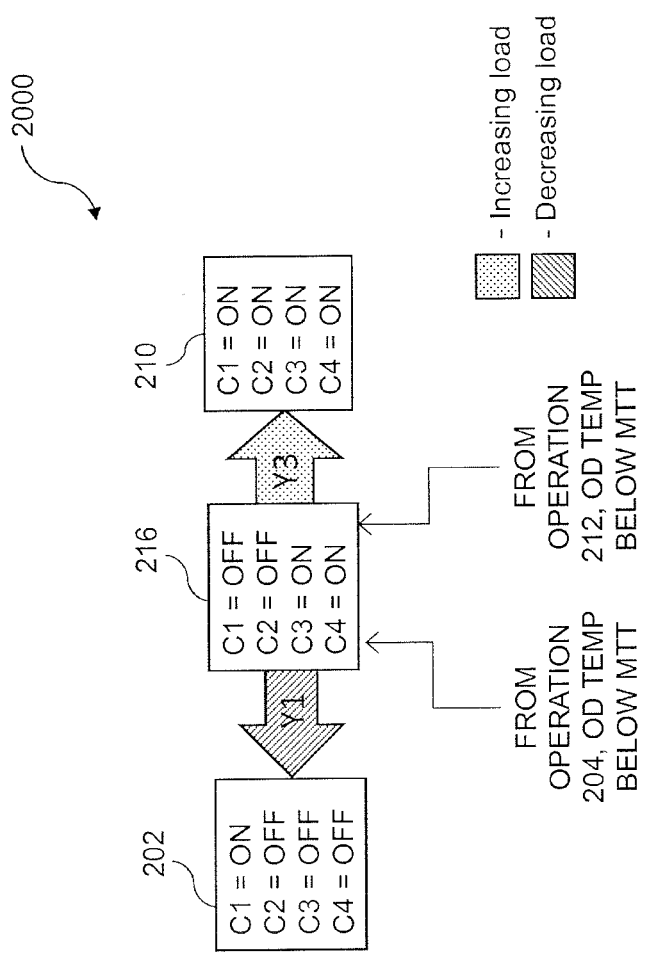

Referring to FIGS. 5A, 5B, and 5C (referred to collectively as "FIG. 5"), a first method 2000 for managing lubricant levels in a tandem compressor assembly of an HVAC system may comprise the first HVAC system 1000 of FIGS. 1-4 configured to respond to measurement of an environmental condition, such as an ambient temperature at or below a mode transition temperature.

The mode transition temperature may be determined based on sump superheat, which is the relationship between the environmental conditions, such as ambient temperature, and the saturated suction temperature. The sump superheat of a compressor is derived by subtracting the saturated sump temperature, which is approximately the saturated suction temperature, from the sump temperature, which in some embodiments is approximated as the ambient temperature. The higher the sump superheat the lower potential for refrigerant to condense as a liquid in the compressor sump.

It may be assumed that the ambient temperature and the temperature of the sumps when the compressors are idle 112, 114 and 113, 115 of each of the first compressor assembly 101 and the second compressor assembly 102, respectively, are about the same. The mode transition temperature may be selected based on the conditions of operation of the first HVAC system 1000, and may be based on the ambient temperature at which the sump superheat drops below about 20 degrees Fahrenheit (+/-2 degrees Fahrenheit).

A low sump superheat may allow liquid refrigerant to collect in the sump of an idle compressor. Sump superheat for an idle compressor in a tandem assembly where the other compressor(s) is running may be in the range of 0 (zero) to 20 (twenty) degrees Fahrenheit for ambient temperatures below 60 degrees Fahrenheit (+/-5 degrees Fahrenheit) and in the 20 (twenty) degrees Fahrenheit and above for ambient temperatures above 60 degrees Fahrenheit (+/-5 degrees Fahrenheit). The ambient temperature threshold may range from approximately 55 degrees Fahrenheit to 65 degrees Fahrenheit.

In some embodiments, the mode transition temperature may be selected to be about 60 degrees Fahrenheit, with a tolerance of about plus or minus 5 (five) degrees Fahrenheit to account for environmental conditions and other known factors. When one of the compressors of a tandem compressor assembly is running, the saturated suction temperature will equalize across all compressor sumps in the assembly. The sump temperature of the idle compressor, at this ambient temperature, is typically at or above 60 degrees Fahrenheit, while the saturated suction temperature of the idle compressor assembly is typically about 45 (forty-five) degrees Fahrenheit. In this scenario, the sump superheat of the idle compressor is equal to or greater than about 20 (twenty) degrees Fahrenheit.

As ambient temperature drops, the sump superheat of the idle compressor drops, which raises the amount of liquid refrigerant and oil that collects in the sump of the idle compressor. The mode transition temperature may correspond to the operational state of the tandem compressor assembly, including the saturated suction temperature, where the sump superheat is at or above about 20 degrees Fahrenheit.

Method 2000 for Managing Lubricant Levels in an HVAC System

Referring to FIGS. 5A, 5B, and 5C (referred to collectively as "FIG. 5"), the first method 2000 may comprise one or more operations for operating the first HVAC system 1000 in at least two modes based on the mode transition temperature. At temperatures at or above the mode transition temperature, the first HVAC system 1000 may be operated in a first mode. The first mode may be configured to operate the first HVAC system 1000 with the objective of maximizing efficiency by operating one compressor in a tandem compressor assembly (e.g. the first compressor assembly 101 or the second compressor assembly 102) when there is only a partial load demanded on the first HVAC system 1000.

At temperatures below the mode transition temperature, the first HVAC system 1000 may be operated in a second mode. The second mode may be configured to operate the first HVAC system 1000 with the objective of extending compressor life and system reliability.

The mode transition temperature, and its corresponding range, may be adjusted to accommodate environmental and operating conditions of the first HVAC system 1000. The mode transition temperature may be affected by operating and environmental conditions, including but not limited to conditions of the air inside the environmentally controlled space, idling time of the compressors, and the air flow rate of the indoor blower 103. In some embodiments, the controller 128 may be configured to measure the real-time sump temperature and suction pressure to determine whether the first HVAC system 1000 should operate in the first mode or the second mode based on the measured ambient temperature.

In operation 200 of the first method 2000 shown in FIG. 5, the first HVAC system 1000 may comprise a pre-demand state, where the first compressor 112 (referred to as "C1" in FIG. 5), the second compressor 114 (referred to as "C2" in FIG. 5), the third compressor 113 (referred to as "C3" in FIG. 5), and the fourth compressor 115 (referred to as "C4" in FIG. 5) are in an OFF state configured not deliver any load. The controller 128 of the first HVAC system 1000 may receive a command or respond to a triggering condition to initiate a multi-stage procedure where one or more of the compressors C1, C2, C3, or C4 will be commanded to an "ON" state for meeting an initial demand.

In some embodiments, the controller 128 may operate the refrigerant compressor assembly 100 in three demand stages—referred to here as first demand stage Y1, second demand stage Y2, and third demand stage Y3, where each stage comprises a successively higher capacity to meet an increasing demand. The third demand stage Y3 may correspond to the upper range of the full capacity of the refrigerant compressor assembly 100.

For example, the full capacity of the HVAC system 1000 may comprise 100% of total available unit capacity. The first demand stage Y1 may correspond to the lower range of capacity of the refrigerant compressor assembly 100 configured to change environmental conditions (e.g. temperature) of the controlled space. For example, the capacity of the first demand stage Y1 may comprise about 25% of total available unit capacity. The second demand stage Y2 may comprises an intermediate capacity between the Y1 capacity and the Y3 capacity, for example about 60% of total available unit capacity. It will be understood by persons of ordinary skill in the art that the range of capacity from lowest to highest may depend on the specifications of the compressors and the efficiency of the HVAC system 1000, among other factors. The operational capacity of each HVAC system 1000 may be tailored to meet the requirements of controlling the environment in the enclosed space.

The first HVAC system 1000 may be configured to transition from a least a lower demand stage to a higher demand stage, where the refrigerant compressor assembly 100 outputs a lower capacity at the lower demand stage, and a higher capacity at the higher demand stage, for example from the first demand stage Y1 to the second demand stage Y2 or from Y2 to Y3. A transition from one stage to another may comprise one or more operations configured to maintain lubricant levels in the sumps of the tandem compressors of the refrigerant compressor assembly 100 and lessen the risk of condensation of refrigerant in the sump of an idle tandem compressor.

In the first mode of operation, the transition from the lower demand stage to the higher demand stage may comprise operating at least a first tandem compressor assembly (e.g. the first compressor assembly 101) at a partial capacity with one compressor operated in an ON-state and the second compressor operated in an OFF-state followed by operating the tandem compressor assembly with both compressors in an OFF-state. The time that both compressors are in the OFF-state may be configured to allow lubricant levels (e.g. oil) to equalize between the two sumps of the first and second compressor.

In the second mode of operation, the transition from the lower demand stage to the higher demand stage may comprise operating at least both compressors of at least a first tandem compressor assembly in an OFF-state to both compressors of the first tandem compressor assembly in an ON-state. In some embodiments, the lower demand stage may comprise a configuration of the refrigerant compressor assembly where all compressors are in an OFF-state, and there is no load demand on the HVAC system 1000, e.g. the pre-demand state shown as operation 200 in FIG. 5A.

By convention, the ON-state or the OFF-state of each compressor C1, C2, C3, or C4 will be referred to here and shown in the figures (i.e. FIGS. 5, 6, 9, and 10) with the equal sign notation. For example, "C1=ON" means that the compressor C1 is running to meet a desired load, and "C1=OFF" means that the compressor C1 is not running to meet a desired load. In some embodiments, the OFF-state may include configurations where the compressor remains in a powered state, but is not delivering pressurized refrigerant to the first HVAC system 1000.

Each compressor in the ON-state may comprise a single fixed capacity, a variable capacity, or a staged capacity of two or more fixed capacities (e.g. a two-stage compressor). The selection of the capacity of each compressor in the ON-state may be adjusted to meet the desired load demand.

In operation 202 shown in FIG. 5A, the controller 128 may operate at a first demand stage capacity Y1 with at least one compressor of a tandem compressor assembly of the first HVAC system 1000 in an ON-state. For example, the first HVAC system 1000 may be operated with C1=ON and C2=OFF, corresponding to the first compressor assembly 101. At least any one of the four compressors may be in an ON-state during operation 202 to meet the demand of the first demand stage Y1. The selection of which compressor (i.e. C1, C2, C3, or C4) of the tandem compressor assembly (i.e. the first compressor assembly) to operate in the ON-state may depend on the individual capacity of each compressor in the tandem assembly and the desired load demand.

In some embodiments, both compressors C3 and C4 of the second compressor assembly 102 may remain in an OFF-state during operation 202. The capacity of the first demand stage Y1 may be configured to meet a relatively low demand that can be met by the operation of a single compressor (e.g. C1). After a certain period of time operating the first HVAC system 1000 at Y1 capacity, the controller 128 may determine that an increase in capacity is required to meet the demand on the first HVAC system 1000.

In operation 204 shown in FIG. 5A, the controller 128 may receive a signal from the thermostat 135 that the ambient temperature is near, at, or above the mode transition temperature (referred to as "MTT" in FIGS. 5 and 8). The relationship of the ambient temperature to the MTT may allow the first HVAC system 1000 to determine whether to operate the first HVAC system 1000 in the first or the second mode.

In operation 206, in response to an indication that the ambient temperature is near, at, or above the MTT, the controller 128 may operate the first HVAC system 1000 at the capacity of the second demand stage Y2 in the first mode with at least one compressor of a second compressor assembly running. The Y2 capacity may correspond to the middle range of the total operating capacity of the refrigerant compressor assembly 100, i.e. a partial load. For example, as shown in operation 206 of FIG. 5A, the controller 128 may operate the refrigerant compressor assembly 100 in a C1=ON, C2=OFF, C3=ON, and C4=OFF configuration.

Compressor C3 may be selected as the running compressor to meet the demand load of the Y2 capacity, because the compressor is on an alternate flow line circuit, which utilizes alternate heat transfer devices, i.e. condenser and evaporator. For example, referring to FIGS. 1 and 2, running the first compressor 112 (corresponding to C1 in FIG. 5) on the flow line circuit 107 in conjunction with the third compressor 113 (corresponding to C3 in FIG. 5) on the flow line circuit 109 allows the first HVAC system 1000 to utilize both portions of the condenser 104 and evaporator 108, portions 104a, 104b and 108a, 108b, respectively. Using both portions of the condenser 104 and the evaporator 108 increases the efficiency of the first HVAC system 1000 over using only one portion of each heat transfer device, because it increases the number of coils available for the transfer of thermal energy between the refrigerant and the environment. For example, if the first HVAC system 1000 were operated with C1 and C2 in an ON-state, where C1 and C2 share the same flow line circuit 107, then the first HVAC system 1000 utilizes only half of the available coils of the condenser 104 and evaporator 108, i.e. portions 104a and 108a, respectively.

In operation 206 shown in FIG. 5A, the controller 128 may determine that an increase in capacity is required to meet the demand on the first HVAC system 1000. The controller 128 may transition the output capacity from the second demand stage Y2 capacity, a partial load, to a third demand stage Y3 capacity, a full load. The Y3 capacity may require that both compressors of the tandem assemblies, e.g. C1 and C2 or C3 and C4, of the refrigerant compressor assembly 100 be operated in an ON-state. The controller 128 may initiate a transition sequence of one or more operations to minimize the risk that the OFF compressors, i.e. compressors C2 and C4 coming from operation 206, will be started with low or diluted lubricant in the respective sumps, sumps 132 and 136 shown in FIG. 2. The transition sequence may comprise turning OFF all compressors of at least one tandem compressor assembly while operating at least one alternate compressor assembly in an ON state.

In operation 208 shown in FIG. 5A, the controller 128 may operate the refrigerant compressor assembly 100 in a C1=OFF, C2=OFF, C3=ON, and C4=OFF configuration for a first transition time period. The first transition time period may be configured to allow sufficient time for lubricant to equalize between the two tandem-connected OFF compressors, i.e. C1 and C2. The first transition time period may further be configured to minimize any reduction in capacity from the refrigerant compressor assembly 100. For example, in operation 208 only one compressor C3 of the second compressor assembly 102, which is a tandem assembly, is running, which may, depending on the total available capacity of C3, result in a reduction delivered capacity by the first HVAC system 1000. In some embodiments where C3 is a variable or at least a two-speed capacity, the controller 128 may increase the delivered capacity from C3 to meet the desired load demands, and increase user comfort during the transition sequence.

In operation 209 shown in FIG. 5A, the controller 128 may operate the refrigerant compressor assembly 100 in a C1=ON, C2=ON, C3=OFF, and C4=OFF configuration for a second transition time period. The second transition time period may be configured in a similar manner as the first transition time period-allowing time for oil equalization between tandem-connected compressors and minimizing any user discomfort due to reduced delivered capacity. In some embodiments where C1 or C2 is a variable capacity or at least a two-speed capacity, the controller 128 may increase the delivered capacity from C1 and C2 to meet the desired load demands, and increase user comfort during the transition sequence.

In some embodiments, the first transition time period and the second transition time period may be about 5 (five) minutes. The transition time periods may be preset in the programming of the controller 128 or calculated by the controller 128 in an adjustable manner based on load demands, the available capacities of the refrigerant compressor assembly 100 during the respective transition operation environmental conditions, and estimations of user comfort. The first transition time period may be different from the second transition time period based on differences in the state of the first HVAC system 1000 and the environment during the two respective operations 208 and 209.

In operation 210 shown in FIG. 5A, the controller 128 may operate at a third-stage Y3 capacity with the refrigerant compressor assembly 100 in a C1=ON, C2=ON, C3=ON, and C4=ON configuration following completion of the transition sequence. The Y3 capacity may be configured to meet the highest anticipated demands on the first HVAC system 1000, and may correspond to the upper range of the total operating capacity of the refrigerant compressor assembly 100, e.g. operating all compressors in the ON-state or at or about their highest speed.

Referring to FIG. 5A, due to demands on the first HVAC system 1000, the controller 128 may change operation of the refrigerant compressor assembly 100 from the operation 200, where all compressors are in an OFF state, directly to operation 204, where the controller 128 determines whether to operate the first HVAC system 1000 in the first mode or the second mode based on ambient temperature. In other embodiments, the controller 128 may change operation of the refrigerant compressor assembly 100 from the operation 200 directly to operation 210, where the controller 128 operates the first HVAC system 1000 at the capacity of the third demand stage Y3 at or near full capacity.

Referring to FIG. 5B, in response to a decrease in demand, for example the environmental conditions are trending toward, near, or at the desired temperature profile, the controller 128 may change operation of the first HVAC system 1000 from a full load at the Y3 capacity (operation 210) to a partial load at the Y2 capacity. Following operation of the first HVAC system 1000 at Y3 capacity and in response to a decrease in demand, the controller 128, in operation 212, may receive a signal from the thermostat 135 that the ambient temperature is above the MTT. In response to an indication that the ambient temperature is above the MTT, the controller 128 may initiate operation 206, described above, to deliver a Y2 capacity.

In response to a further decrease in demand, the controller 128 may change operation of the first HVAC system 1000 from the capacity of the second demand stage Y2 (operation 206) to the YI capacity. The controller 128 may initiate operation 202, described above, to deliver a Y1 capacity.

Referring now to FIG. 5C, the controller 128, in either operation 204 (shown in FIG. 5A) or in operation 212 (shown in FIG. 5B), may receive a signal from the thermostat 135 that the ambient temperature is below the MTT. In response, the controller 128, in operation 216 may operate the first HVAC system 1000 at the Y2 stage capacity in a C1=OFF, C2=OFF, C3=ON, and C4=ON configuration. If the controller determines that a greater capacity is required, e.g. a Y3 capacity, then the HVAC system may be operated with all compressors ON (operation 210). By switching both compressors of each tandem assembly (e.g. C1 and C2) from an OFF-OFF configuration to an ON-ON configuration, the controller 128 avoids operating the compressors C1 and C2, in other embodiments compressors C3 and C4, in an ON-OFF configuration in the second mode of operation, and lessens the risk of condensation of oil in the sump of the idle compressor of the tandem assembly. If the controller 128 determines that a lesser capacity is required, e.g. a Y1 capacity, then the first HVAC system 1000 may be operated with C1=ON and the remainder of compressors OFF (operation 202).

Second HVAC System 1002

Figure 6:
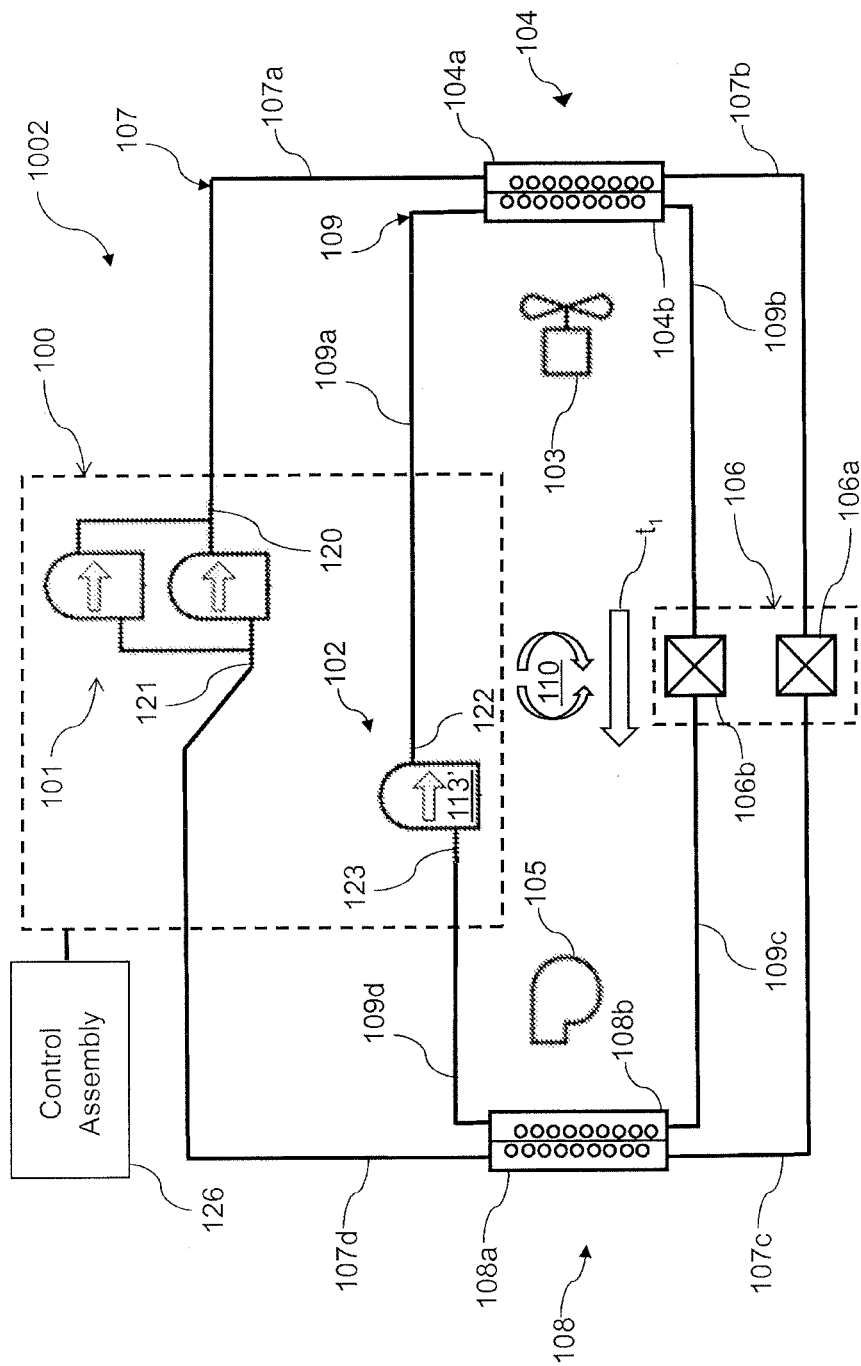
FIG. 6 illustrates a second HVAC system having a first and second compressor assembly.
Figure 7:
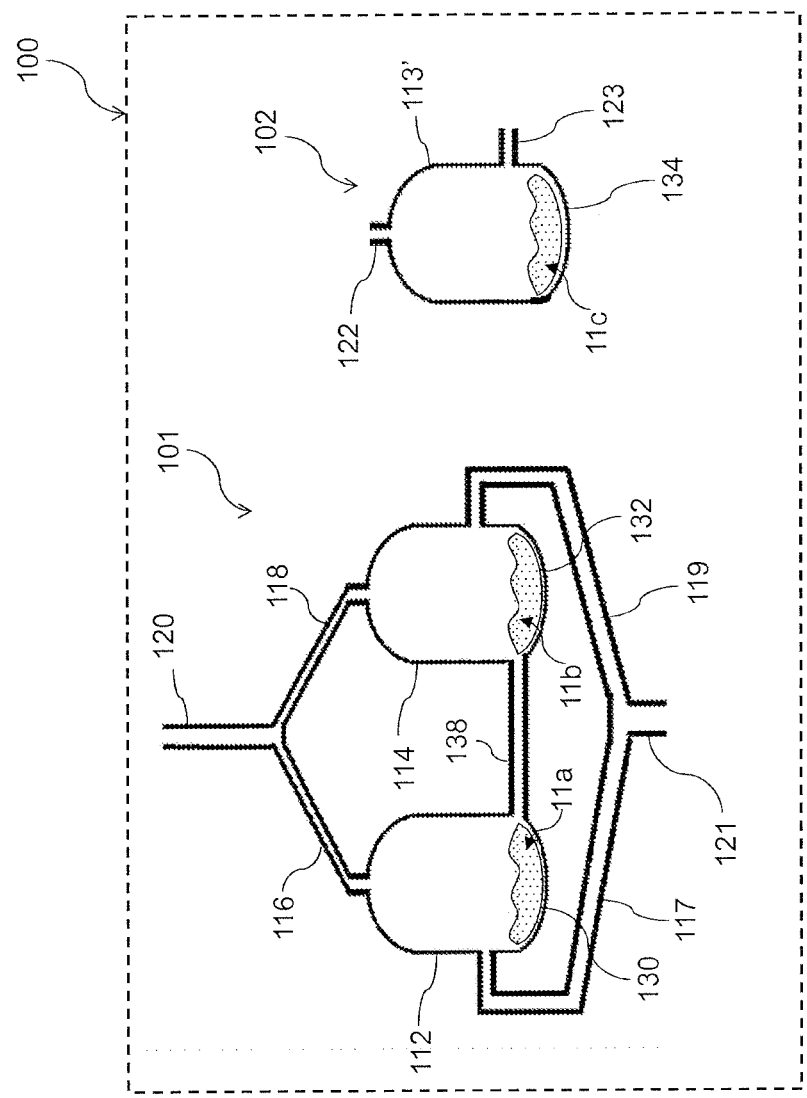
FIG. 7 shows a schematic of the first and second compressor assembly illustrated in FIG. 6.

In other embodiments, as shown in FIGS. 6 and 7, the second compressor assembly 102 of a second HVAC system 1002 may comprise a single two-speed compressor, referred to as the third compressor 113', operated in conjunction with the first compressor assembly 101, a tandem compressor assembly. Except where as noted, the second HVAC system 1002 may include substantially similar or the same components as the first HVAC system 1000, described in FIGS. 1-4, including, but not limited to, the control assembly 126 and controller 128, described herein and shown in FIGS. 1, 3, and 6. Components of the second HVAC system 1002 that are substantially similar or the same will be referenced using the same reference numerals as those shown in FIGS. 1-4 for the first HVAC system 1000.

Referring to FIGS. 6 and 7, the third compressor 113' may comprise the suction line 123 and the discharge line 122. These lines 123, 122 are tied into second condenser portion 104b and second evaporator portion 108b of the flow line circuit 109 (shown in the segments 109a-d), which is a separate circuit from the flow line circuit 107, as described above in regard to FIGS. 1 and 2. The third compressor 113' may also comprise a sump 134, which does not share lubricant with the other compressors 112, 114

Second Method 3000 for Managing Lubricant Levels in an HVAC System

Referring to FIGS. 8A, 8B, 8C, and 8D (referred to collectively as "FIG. 8"), a second method 3000 for managing lubricant levels of a tandem compressor assembly in an HVAC system may comprise the second HVAC system 1002 of FIGS. 6 and 7. The second HVAC system 1002 may be configured to respond to measurement of an ambient temperature at or below the mode transition temperature ("MTT"), for example by use of temperature data from the temperature detecting assembly 129 and thermostat 135, as shown and described in FIGS. 3 and 4.

The second HVAC system 1002 may be configured to operate in one or more modes based on the effect of ambient temperature on the sump superheat of an idle compressor. At temperatures above the MTT, the HVAC system 1002 may be operated in a third mode with the objective of maximizing efficiency. The third mode of the second method 3000 may include similar operations to the first mode of the first method 2000 (described in FIG. 5). For example, the tandem compressor assembly (i.e. the first compressor assembly 101 shown in FIGS. 6 and 7) may be operated with one compressor ON and the other OFF, when there is only a partial load demanded on the HVAC system 1002. When transitioning from a partial load to a full load in the first mode of operation, all compressors in the tandem compressor assembly may be turned to an OFF-state to allow time for oil to equalize between the sumps of the tandem-connected compressors, before the compressors are resumed to at or near full capacity. An alternate compressor assembly may deliver an output load from the second HVAC system 1002 during the transition time period of the third mode.

At temperatures below the MTT, the second HVAC system 1002 may be operated in a fourth mode with the objective of extending compressor life, i.e. maximizing reliability. The fourth mode of the second method 3000 may include similar operations to the second mode of the first method 2000 (described in FIG. 5). For example, under partial loads in a lower demand stage, the load demand may be switched—turning OFF the compressors of the tandem compressor assembly—to the alternate compressor assembly (i.e. the second compressor assembly 102) to avoid operating tandem compressor system (i.e. the first compressor assembly 101 shown in FIGS. 6 and 7) of the refrigerant compressor assembly 100 with one compressor in an ON-state and the other in an OFF-state. When the second HVAC system 1002 transitions to a subsequent higher demand stage, e.g. to full capacity, the OFF compressors of the tandem assembly may be jointly switched ON.

Figure 8A:
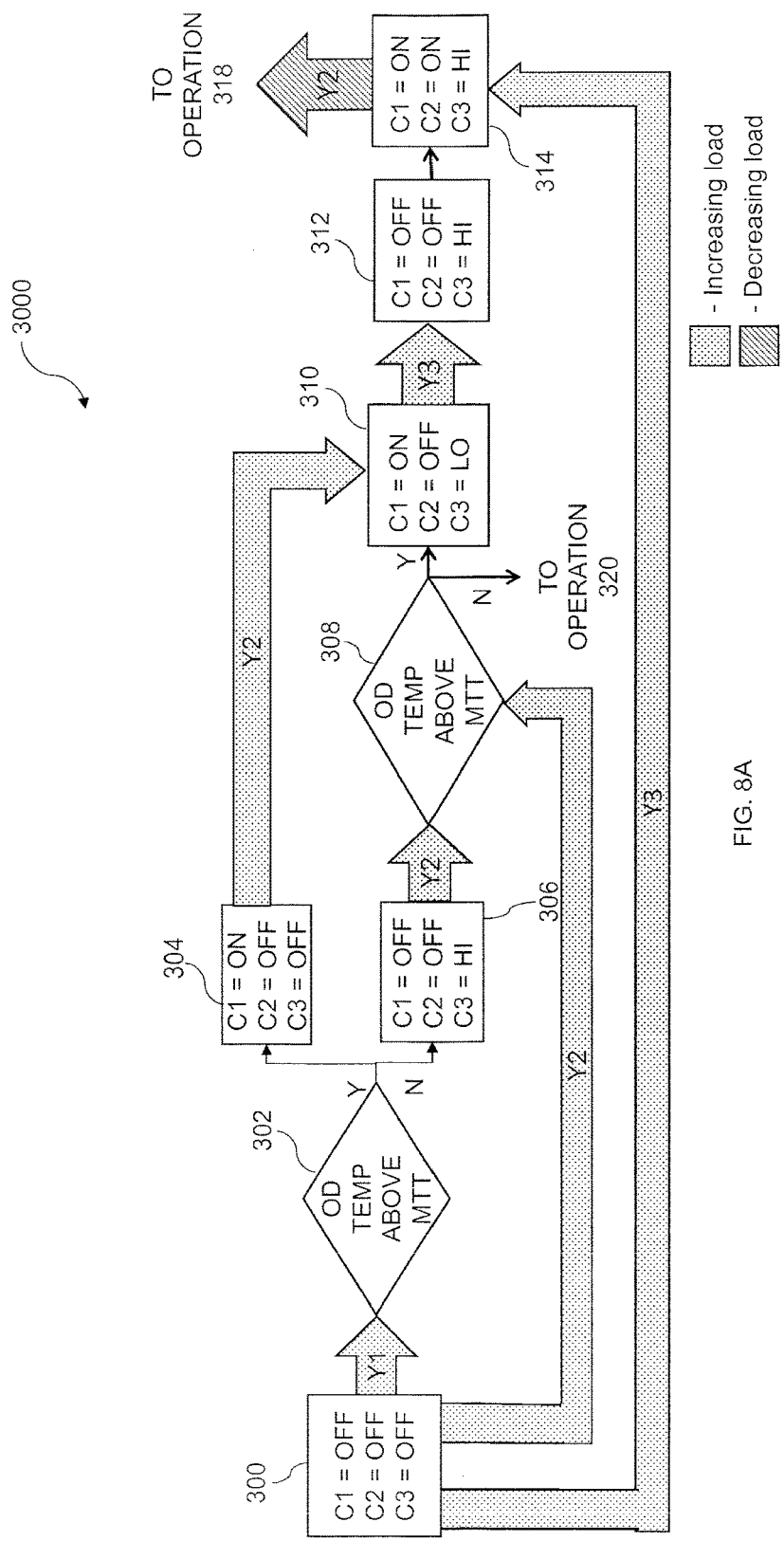
FIGS. 8A, 8B, 8C, and 8D show a flow chart of operations of a second method for managing lubricant levels in a multi-compressor assembly of an HVAC system.

In operation 300 of the second method 3000 shown in FIG. 8A, the second HVAC system 1002 may comprise a pre-demand state, where the first compressor 112 (referred to as "C1" in FIG. 8), the second compressor 114 (referred to as "C2" in FIG. 8), and the third compressor 113' (referred to as "C3" in FIG. 8) are in an OFF-state configured not deliver any load.

The controller 128 of the second HVAC system 1002 may receive a command or respond to a triggering condition to initiate a multi-stage procedure where one or more of the compressors C1, C2, or C3 will be commanded to an ON-state for meeting an initial demand. As previously described for method 2000, the multi-stage procedure may comprise a first-stage Y1 capacity corresponding to the lower range of the total operating capacity of the refrigerant compressor assembly 100, a second-stage Y2 capacity corresponding to the middle range of available capacity, and a third-stage Y3 capacity corresponding to the upper range, including full load, of capacity available to the refrigerant compressor assembly 100. In some embodiments, the pre-demand state of operation 300 may comprise a lower demand stage relative to higher demand stages Y1, Y2, and Y3.

In operation 302 shown in FIG. 8A, the controller 128 may receive a signal from the thermostat 135 that the ambient temperature is near, at, or above the MTT. The relation of the ambient temperature to the MTT may allow the second HVAC system 1002 to determine whether to operate the second HVAC system 1002 in the third or the fourth mode.

In operation 304 shown in FIG. 8A, in response to an indication that the outside ambient temperature is at or above the MTT, the controller 128 may operate at a first-stage capacity Y1 in the third mode with at least one compressor of a tandem compressor assembly of the second HVAC system 1002 in an ON state. For example, the second HVAC system 1002 may be operated with C1=ON and C2=OFF. Compressor C3 of the second compressor assembly 102 may remain OFF during operation 304.

After operating the second HVAC system 1002 at Y1 capacity, the controller 128 may determine that an increase in capacity is required to meet the demand on the second HVAC system 1002. From operation 304, the controller 128 may operate the second HVAC system 1002 at a second-stage capacity Y2 in the third mode with at least one compressor of the first compressor assembly 101 (e.g. C1) running. As shown in FIG. 8A, the third compressor 113' of the second compressor assembly 102, which may be a two-stage compressor, may be operated at its lower speed (referred to as "LO" in FIG. 8) to meet the intermediate demand loads of the Y2 capacity.

Alternatively, in operation 306, in response to an indication that the outside ambient temperature is below the MTT, the controller 128 may operate at a first-stage capacity Y1 in the fourth mode with both compressors of the tandem compressor assembly of the HVAC system 1002 in an OFF state. For example, the second HVAC system 1002 may be operated with C1=OFF and C2=OFF. Compressor C3 of the second compressor assembly 102 may be operated at the HI speed setting.

In operation 308 shown in FIG. 8A, the controller 128 may receive a signal from the thermostat 135 that the ambient temperature is near, at, or above the MTT, which provides further indication whether the HVAC system 1002 should be operated in the third or fourth mode. In response to an indication that the ambient temperature is near, at, or above the MTT, the controller 128 may operate the second HVAC system 1002 according to operation 310, described above, following operation 308.

In some embodiments, where load demand is in the lower range of the Y2 capacity, the third compressor 113' may be turned OFF. It may be advantageous in operation 310 to operate the third compressor 113' at least at its LO speed in conjunction with compressor C1 so that both available sets of coils from each portion of the condenser 104 and the evaporator 108 are utilized in the heat transfer cycle 110. Operation of the second HVAC system 1002 in this manner may result in shorter operation times and save on energy costs, under some circumstances.

After operating the second HVAC system 1002 at the Y2 capacity in operation 310, the controller 128 may determine that an increase in capacity is required to meet the demand on the second HVAC system 1002. The controller 128 may transition the output capacity to the third demand stage Y3 capacity, a full load. The Y3 capacity may require that both compressors of the tandem assembly, e.g. C1 and C2, of the refrigerant compressor assembly 100 be operated in an ON-state. In operation 312, the controller 128 may initiate a transition sequence of one or more operations to minimize the risk that the OFF compressors, i.e. compressor C2, coming from operation 310, will be started with low or diluted lubricant in the respective sumps 130, 132 shown in FIG. 7. The transition sequence may comprise turning OFF all compressors of at least one tandem compressor assembly while operating at least one alternate compressor assembly in an ON state.

In operation 312 shown in FIG. 8A, the controller 128 may operate the refrigerant compressor assembly 100 in a C1=OFF, C2=OFF, C3=HI configuration in the third mode for a third transition time period. The third transition time period may be configured to allow sufficient time for lubricant to equalize between the two tandem-connected OFF compressors, i.e. C1 and C2. In a manner similar to the first and second transition time periods discussed above and in FIG. 5, the third transition time period may further be configured to minimize any reduction in capacity from the refrigerant compressor assembly 100. During the third transition time period, the compressor C3 (i.e. the third compressor 113' shown in FIGS. 6 and 7) may be operated at its high speed (referred to as "HI" in FIG. 8) to meet load demands, and to reduce any user discomfort due to reduced capacity.

In some embodiments, the third transition time period is about five minutes. The third transition time period may be preset in the programming of the controller 128 or calculated by the controller 128 in an adjustable manner based on load demands, environmental conditions, and estimations of user comfort.

In operation 314 shown in FIG. 8A, the controller 128 may operate the second HVAC system 1002 at a third demand stage Y3 with the refrigerant compressor assembly 100 in a C1=ON, C2=ON, and C3=HI configuration following completion of the transition sequence. As shown in FIG. 8A, the third compressor 113' of the second compressor assembly 102 may be operated at about its highest speed to meet the full demand loads of the Y3 capacity.

Referring to FIG. 8A, due to demands on the second HVAC system 1002, the controller 128 may change operation of the refrigerant compressor assembly 100 from the operation 300, where all compressors are in an OFF-state, directly to operation 308, where the controller 128 determines whether to operate the second HVAC system 1002 in the first mode or the second mode based on ambient temperature. In other embodiments, the controller 128 may change operation of the refrigerant compressor assembly 100 from the operation 300 directly to operation 314, where the controller 128 operates the second HVAC system 1002 at the third-stage Y3 capacity at or near full capacity.

After operating the second HVAC system 1002 at Y3 capacity (for example in operation 314 shown in FIG. 8A), the controller 128 may determine that a decrease in capacity may meet a lower demand on the second HVAC system 1002, for example, because the temperature or other environmental conditions in the enclosed space is trending towards the desired temperature profile. In operation 318 shown in FIG. 8C, the controller 128 may receive a signal from the thermostat 135 that the ambient temperature is near, at, or above the MTT, which provides further indication whether the second HVAC system 1002 should be operated in the third or fourth mode.

Figure 8B:
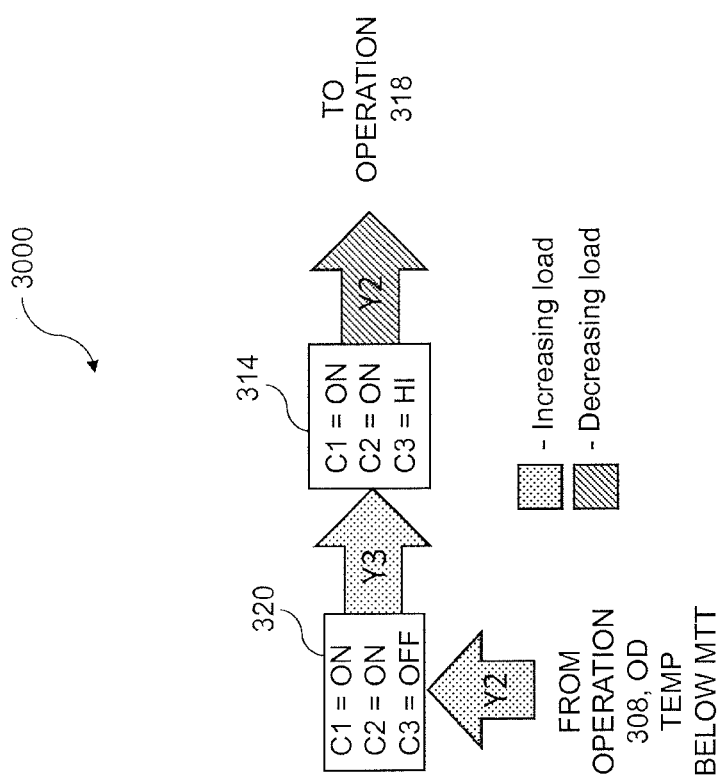
Figure 8C:
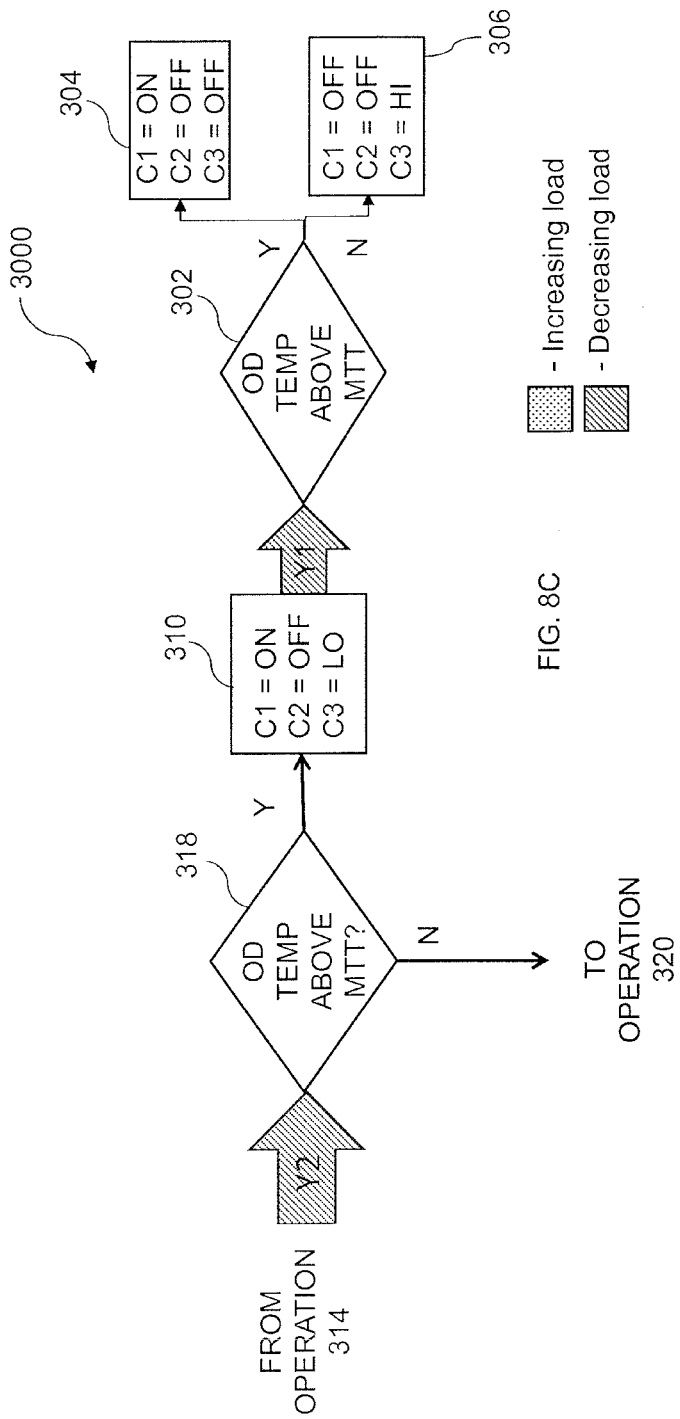

In operation 310 shown in FIG. 8C, in response to an indication that the ambient temperature is near, at, or above the MTT, the controller 128 may operate the second HVAC system 1002 at a second-stage capacity Y2 in the third mode with at least one compressor of the first compressor assembly 101 (e.g. C1=ON and C2=OFF) running. The compressor C3 (third compressor 113') may be operated at its LO speed setting.

After operating the second HVAC system 1002 at the Y2 capacity, the controller 128 may determine that a lower capacity, e.g. Y1 capacity, may meet the load demand. In operation 304 shown in FIG. 8C, in response to an indication that the ambient temperature is near, at, or above the MTT (operation 302), the controller 128 may operate the second HVAC system 1002 at the Y1 capacity according to the third mode, described previously. Alternatively, in operation 306, in response to an indication that the ambient temperature is below the MTT (operation 302), the controller 128 may operate the second HVAC system 1002 at the Y1 capacity according to the fourth mode, described previously.

Referring now to FIG. 8B, the controller 128, in operation 308 (shown in FIG. 8A), may receive a signal from the thermostat 135 that the ambient temperature is below the MTT. In response, the controller 128 in operation 320 may operate the second HVAC system 1002 at a second demand stage Y2 capacity with the refrigerant compressor assembly 100 in a C1=ON, C2=ON, and C3=OFF configuration following completion of the transition sequence.

If in operation 320 shown in FIG. 8B, the controller 128 determines that a greater capacity is required, e.g. a Y3 capacity, then the second HVAC system 1002 may be operated with all compressors ON (operation 314). The third compressor 113' (C3 in FIG. 8B) may be operated at its HI speed setting to meet the required load demand.

Figure 8D:
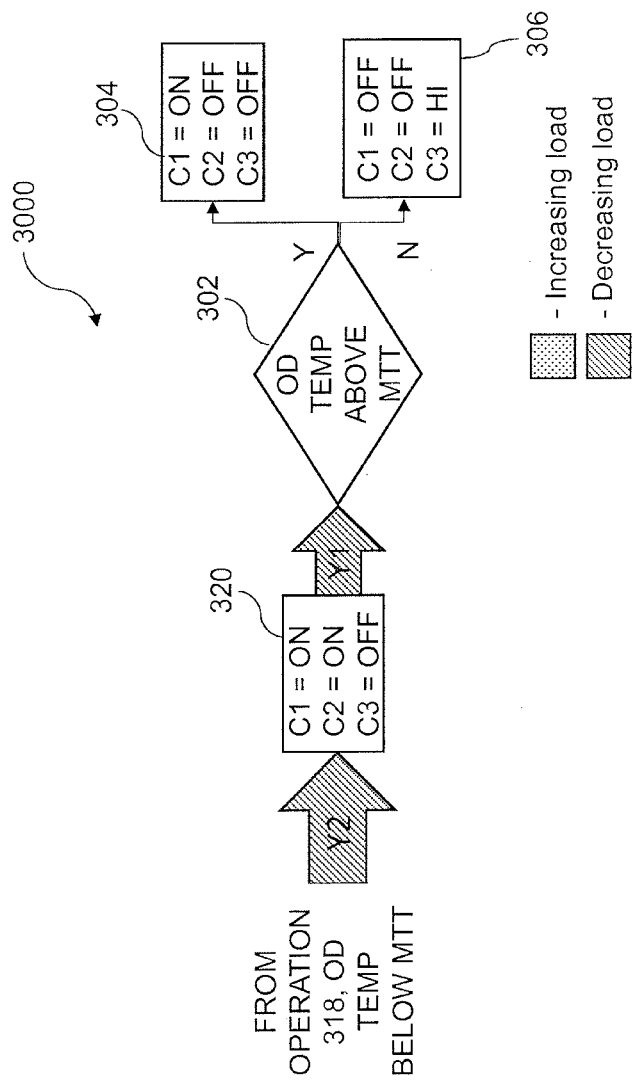

Referring to FIG. 8D, in response to a decrease in demand, for example the environmental conditions are trending toward, near, or at the desired temperature profile from the operation 314 referred to in FIG. 8C, the controller 128 may change operation of the second HVAC system 1002 from a full load at Y3 capacity (operation 314) to a partial load at Y2 capacity. The controller 128, in operation 318, may receive a signal from the thermostat 135 that the ambient temperature is below the MTT. In response to an indication that the ambient temperature is below the MTT, the controller 128 may initiate operation 320, described above, to deliver a Y2 capacity. As the load demand decreases to the range of the Y1 capacity, the controller 128 may receive a signal from the thermostat 135 that the ambient temperature is near, at, or above the MTT (operation 302 shown in FIG. 8D). If so, the controller 128 may operate the second HVAC system 1002 according to operation 304, described above, in a C1=ON, C2=OFF, and C3=OFF configuration. If not, the controller 128 may operate the second HVAC system 1002 according to operation 306, described above, in a C1=OFF, C2=OFF, and C3=HI configuration.

It will be understood by persons of ordinary skill in the art that the controller 128 may determine during any operation that demand on the HVAC systems 1000 and 1002 has been satisfied (for example, the desired temperature profile has been achieved in the enclosed space) and may perform operations to decrease capacity, e.g. demand stages Y3 to Y2 to Y1, and subsequently turn OFF all compressors. In other embodiments, the controller 128 may change the operation of all compressors to an OFF state, as shown in operations 200 and 300, without further transition to lower capacity stages.

It will be understood by persons of ordinary skill in the art that the controller 128 may comprise one or more processors and other well-known components. The controller 128 may further comprise two or more components operationally connected but located in separate in locations in the HVAC systems 1000 and 1002, including operationally connected by wireless communications. For example, the controller 128 may comprise a first controller unit located on an outside portion of the HVAC system (where the compressor and condenser may be), a second controller unit located on an inside portion (where the evaporator may be), a thermostat for monitoring environmental conditions (on a wall of an enclosed space), and a control unit accessible for user input (embodied on a hand-held wireless unit). The controller 128 may further comprise a timing function for measuring the time periods disclosed herein.

Two Stage and Four Stage Systems

HVAC systems utilizing multiple demand stages may be operated under the same or similar methods for managing lubricant levels of a tandem compressor assembly as the three stage system discussed above in FIGS. 1-8. Referring to FIGS. 9A and 9B, there is shown in a table format, by example, compressor switching operations for compressors in a dual tandem system having two demand stages—Y1, a lower demand stage, and Y2, a higher demand stage. FIGS. 9C and 9D, show by example compressor switching operations of a dual tandem system having four demand stages—Y1, Y2, Y3, and Y4 each successively comprising a higher capacity to meet an increasing load demand. In some embodiments, tandem assembly 1 and tandem assembly 2 referenced in FIGS. 9A-9D may comprise the first compressor assembly 101 and the second compressor assembly 102 of the first HVAC system 1000 shown in FIGS. 1 and 2.

Referring to FIG. 9A, in the first mode of operation, the controller 128 (shown in FIG. 3) may transition the refrigerant compressor assembly 100 from the first demand stage Y1 (i.e. the lower demand stage) to the second demand stage Y2 (i.e. the higher demand stage). In transition operation $T_1$, the controller 128 may operate the refrigerant compressor assembly 100 in a C1=OFF, C2=OFF, C3=ON, and C4=OFF configuration for the first transition time period in a manner the same or similar to operation 208 in FIG. 5A. In transition operation $T_2$, the controller 128 may operate the refrigerant compressor assembly 100 in a C1=ON, C2=ON, C3=OFF, and C4=OFF configuration for the second transition time period in a manner similar to the operation 209 of FIG. 5A.

Referring to FIG. 9C, similar transitions operations $T_1$ and $T_2$ may be utilized in a four stage system. For example, transition operation $T_1$ may be utilized between the second demand stage Y2 and the third demand stage Y3, and transition operation may be utilized between the third demand stage Y3 and the fourth demand stage Y4.

Referring to FIG. 9B, in the second mode of operation, the controller 128 (shown in FIG. 3) may transition the refrigerant compressor assembly 100 from the pre-demand state Y0 to the first demand stage Y1 and to the second demand stage Y2. In some embodiments, the lower demand stage may include the pre-demand state (e.g. operation 300 in FIG. 8A) where all compressors are in an OFF-state. In the first demand stage Y1, the controller 128 may operate the first HVAC system 1000 in a C1=ON, C2=ON, C3=OFF, and C4=OFF configuration to transition from the pre-demand stage Y0 to the first demand stage Y1. In the second demand stage Y2, the controller 128 may operate the first HVAC system 1000 in a C1=ON, C2=ON, C3=ON, and C4=ON configuration.

By switching both compressors of each tandem assembly 1 and 2 in FIG. 9B from an OFF-OFF configuration to an ON-ON configuration and avoiding an ON-OFF configuration in the second mode of operation, the refrigerant compressor assembly 100 is operated in a manner similar to operation 216 in FIG. 5C. Similar compressor switching operations may be utilized in the four stage system represented in FIG. 9D. For example, compressors C3 and C4 are operated in the OFF-OFF configuration in the first demand stage Y1 and transitioned to the ON-ON configuration in the second demand stage Y2. Compressors C1 and C2 are operated in the OFF-OFF configuration in the second demand stage Y2 and transitioned to the ON-ON configuration in the third demand stage Y3. In the lower demand stage, e.g. Y2 relative to the higher demand stage Y3, the load demand may be switched-turning OFF the compressors of the tandem assembly 1—to the alternate tandem assembly 2.

Referring to FIGS. 10A and 10B, there is shown in a table format, by example, compressor switching operations for compressors (referred to as C1 and C2) in a tandem assembly 1 operated in conjunction with a two-speed single compressor (referred to as C3), where the compressor assembly operates in two demand stages—Y1, a lower demand stage, and Y2, a higher demand stage. FIGS. 10C and 10D, show by example compressor switching operations of a tandem assembly 1 operated in conjunction with a two-speed single compressor having four demand stages—Y1, Y2, Y3, and Y4, each stage having a successively higher capacity to meet a higher demand. In some embodiments, tandem assembly 1 and the two-speed compressor referenced in tables of FIGS. 10A-10D may comprise the first compressor assembly 101 and the second compressor assembly 102 of the second HVAC system 1002 shown in FIGS. 6 and 7.

The two-stage system referred to in FIG. 10A and the four-stage system referred to in FIG. 10C may include the same or similar transition operations from a lower demand stage, where tandem compressors are operated in an ON-OFF state to a higher demand stage, where both tandem compressors are operated in an ON-state, as those disclosed for operation of the three stage system in the first mode, shown in FIG. 8. For example, in transition operation $T_3$ shown in FIG. 10A, the controller 128 transitioning the second HVAC system 1002 from demand stages Y1 to Y2 may operate the refrigerant compressor assembly 100 in a C1=OFF, C2=OFF, C3=HIGH configuration for the third transition time period in a manner the same or similar to operation 312 in FIG. 8A. In the transition operation $T_3$ shown in FIG. 10C, the controller 128 transitioning the second HVAC system 1002 from the third demand stage Y3 to the fourth demand stage Y4 may operate the refrigerant compressor assembly 100 in a C1=OFF, C2=OFF, C3=HIGH configuration for the third transition time period in the same or a similar manner to operation 312 in FIG. 8A. In the higher demand stage, i.e. demand stage Y2 in FIG. 10A and demand stage Y4 in FIG. 10C, both compressors of the tandem assembly 1 are operated in the ON-state.

The two-stage system referred to in FIG. 10B and the four-stage system referred to in FIG. 10D may include the same or similar transition operations from a lower demand stage, where the compressors of the tandem assembly 1 are operated in an OFF-OFF state to a higher demand stage, where both tandem compressors are operated in an ON-state, as those disclosed for operation of the three stage system in the second mode, shown in FIG. 8. For example as shown in FIG. 10B, the controller 128 may operate the second HVAC system 1002 in a C1=ON, C2=ON, C3=OFF configuration to transition from the pre-demand state Y0, where both tandem compressors C1 and C2 are in an OFF-state to the first demand stage Y1. As shown in FIG. 10D, tandem compressors C1 and C2 are operated in the OFF-OFF configuration in the second demand stage Y2 and transitioned to the ON-ON configuration in the third demand stage Y3. The speed of the 2-speed compressor C3, as an alternate compressor assembly, may be adjusted in the first, second, third and fourth demand stages Y1, Y2, Y3, Y4 of the two-stage and four stage system to meet the desired capacity during the transitions between stages.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

Third Method 1100 for Managing Lubricant Levels in an HVAC System

Figure 11:
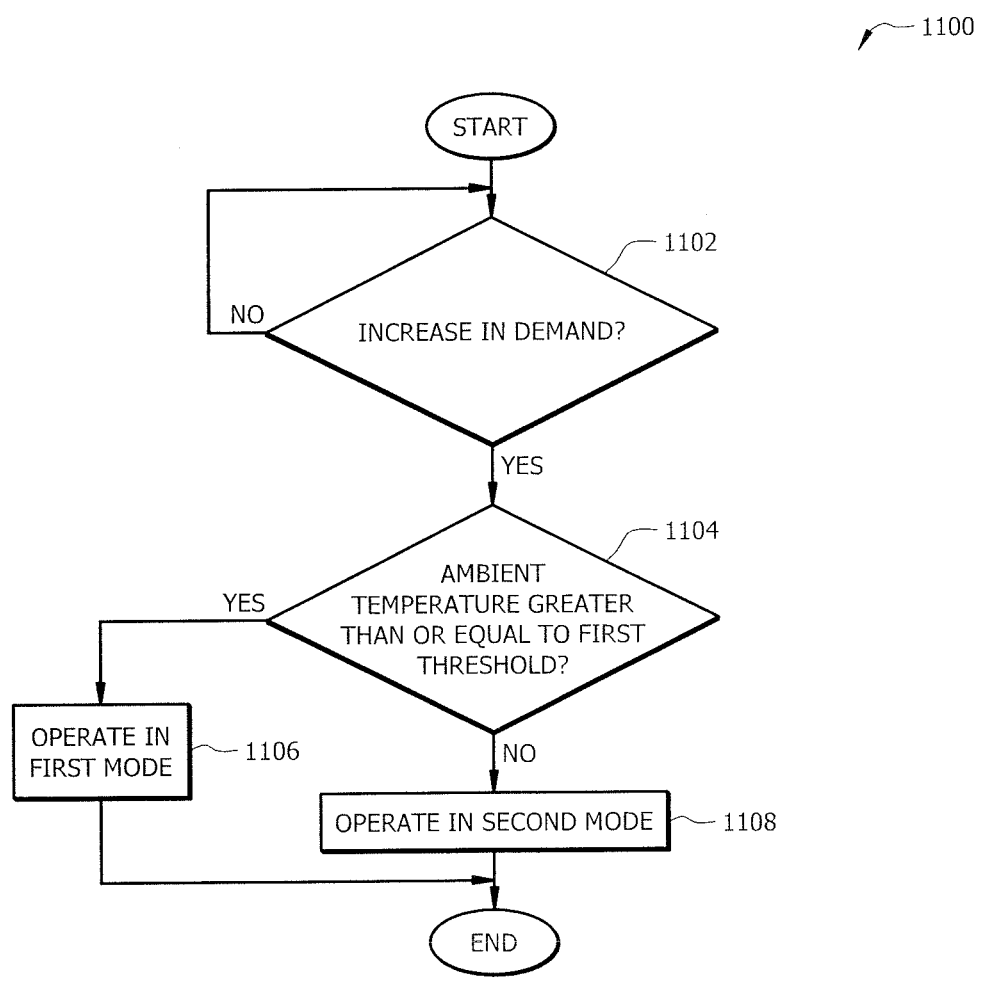
FIG. 11 illustrates a flowchart describing an example of managing lubricant levels in a multi-compressor assembly of an HVAC system.
Figure 12:
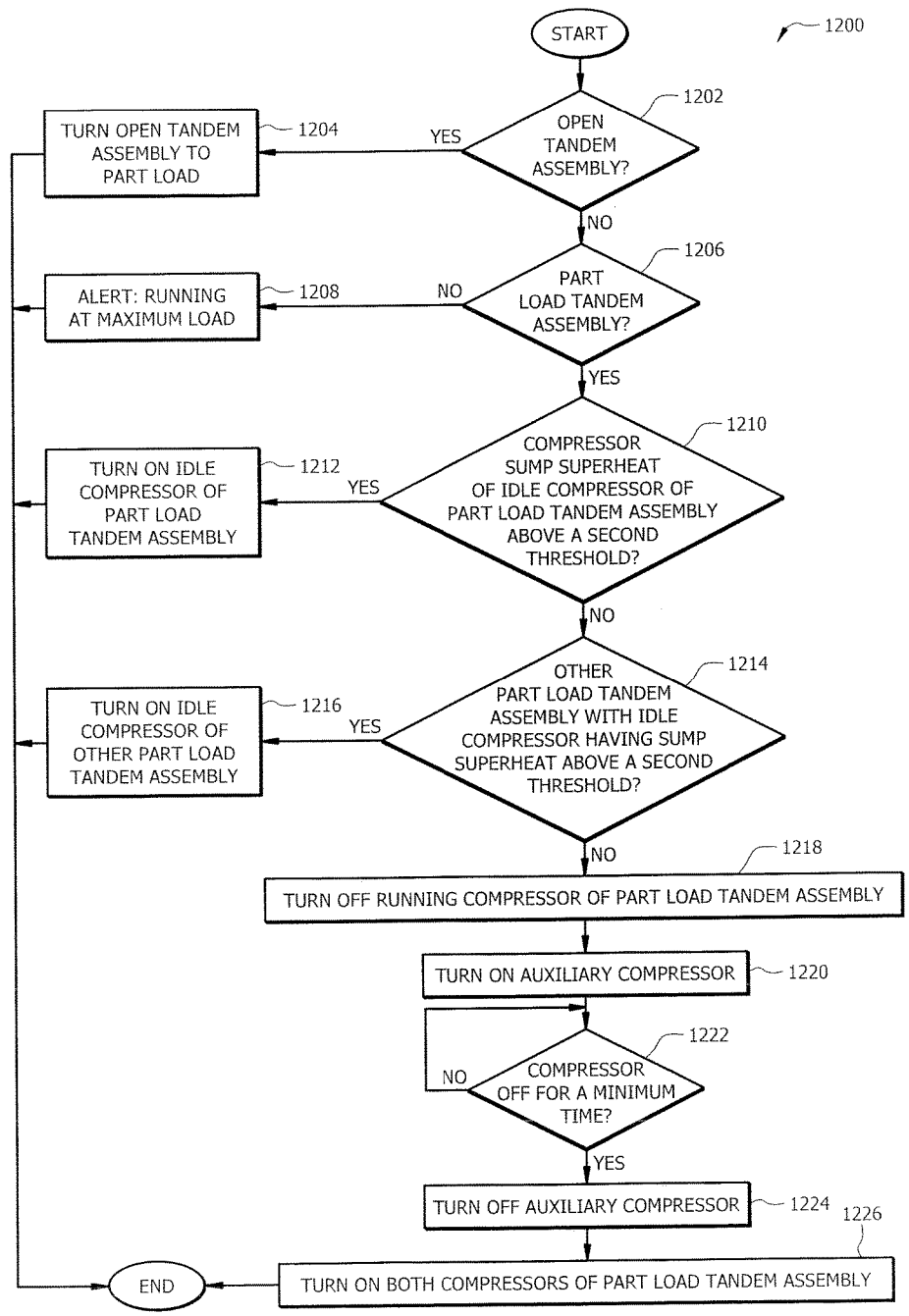
FIG. 12 illustrates a flowchart describing an example of managing lubricant levels in a multi-compressor assembly of an HVAC system.
Figure 13:
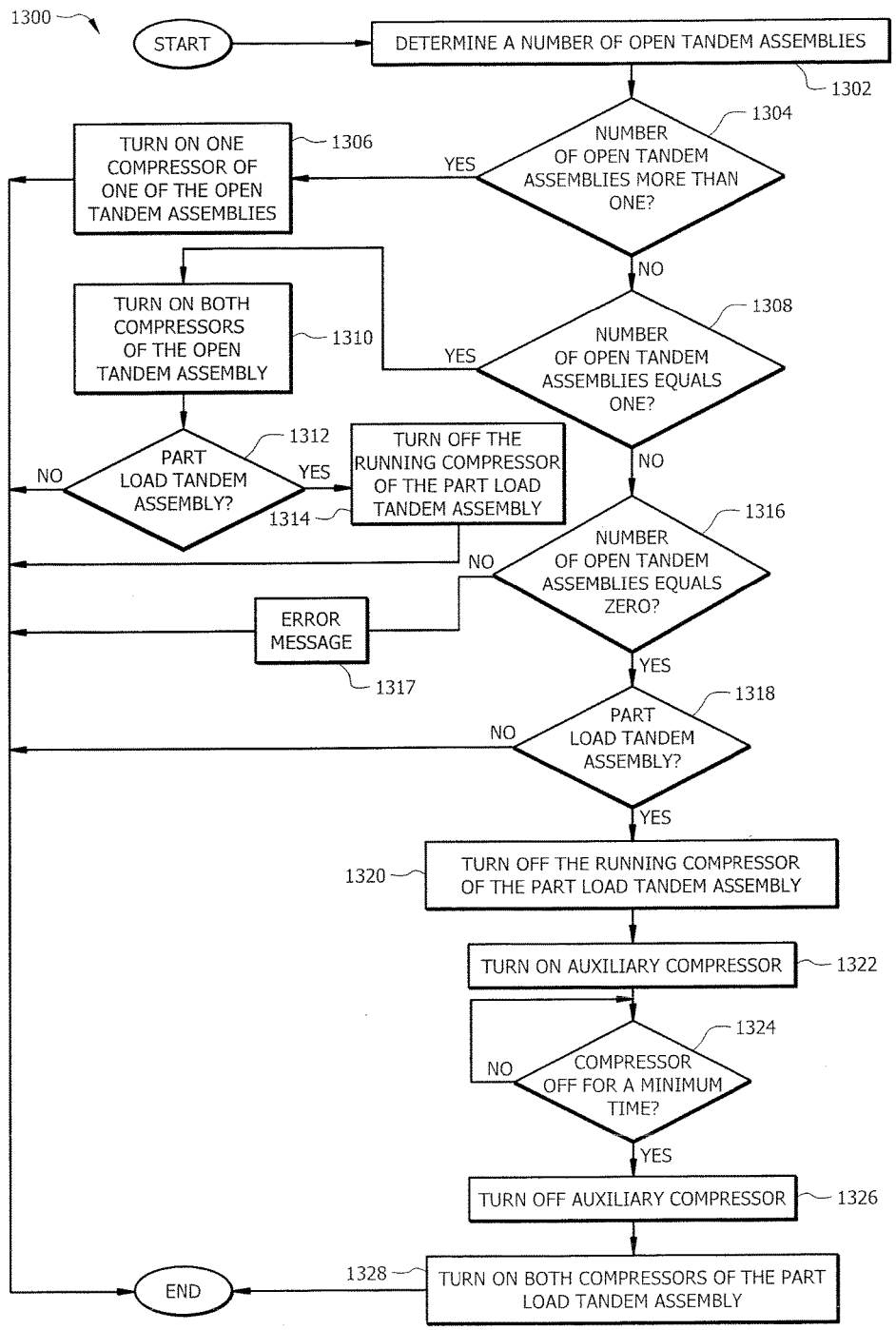
FIG. 13 illustrates a flowchart describing an example of managing lubricant levels in a multi-compressor assembly of an HVAC system.

FIGS. 11, 12, and 13, illustrate a flowchart describing an example of a third method for managing lubricant levels in a multi-compressor assembly of an HVAC system. To illustrate examples of managing lubricant levels in a multi-compressor assembly, the steps of FIGS. 11, 12, and 13, described below, discuss components of FIGS. 1, 2, 3, 6, and 7, although other components not illustrated in FIGS. 1, 2, 3, 6, and 7 may be used. HVAC system may comprise the first HVAC system 1000 of FIGS. 1 and 2, the second HVAC system 1002 of FIGS. 6 and 7, or any configuration of the HVAC system. The HVAC system may comprise a plurality of tandem compressor assemblies 101 and 102. For example, HVAC system may comprise three, four, five, six, or any number of tandem compressor assemblies, each having a first compressor and a second compressor. The HVAC system may also comprise an auxiliary compressor, such as 113', which is a single-circuit compressor that operates in connection with tandem compressors 101 and 102. Controller 128 may perform this method as a way to allow the HVAC system to manage lubricant levels in a multi-compressor assembly such that the compressors may operate with reduced risk of damage or failure.

FIG. 11 illustrates a flowchart describing an example of managing lubricant levels in a multi-compressor assembly of an HVAC system. At step 1102, in some embodiments, controller 128 determines whether there is an increase in cooling demand for the structure. Controller 128 may receive this information from temperature detection assembly 129. If the structure requires further cooling, controller 128 may determine an increase in cooling demand. Temperature detection assembly 129 may determine the current temperature using thermostat 135 and compare that to the requested temperature of the structure to determine that there is an increase in the cooling demand. If, at step 1102, controller 128 determines an increase in cooling demand does not exist, it continues to receive information from the temperature detection assembly 129 until it determines an increase in cooling demand. If, at step 1102, controller 128 determines there is an increase in cooling demand, then the method continues to step 1104.

At step 1104, in some embodiments, controller 128 determines whether ambient temperature is greater than or equal to a first threshold. For example, controller 128 may receive information from temperature detection assembly 129 regarding the ambient temperature and thermostat 135. The first threshold may be set to any temperature, for example, temperatures ranging between 55 degrees Fahrenheit and 65 degrees Fahrenheit. If at step 1104, controller 128 determines that the ambient temperature is greater than or equal to the first threshold (e.g., 60 degrees Fahrenheit) then the method continues to step 1106 where controller 128 operates in a first mode. If, at step 1104, controller 128 determines that the ambient temperature is not greater than or equal to a first threshold (e.g., 60 degrees Fahrenheit) then the methods continues to step 1108 where controller 128 operates in a second mode. FIG. 12 shows an example method of controller 128 operating in a first mode according to step 1106. FIG. 13 shows an example method of controller 128 operating in a second mode according to step 1108. After this, the method ends.

Modifications, additions, or omissions may be made to the methods described in FIG. 11 without departing from the scope of the disclosure. For example, the steps may be combined, modified, or deleted where appropriate, and additional steps may be added. For example, if controller 128 determines that the ambient temperature is greater than or equal to a first threshold, then controller 128 will operate in a first mode and step 1108 may be omitted. Additionally, the steps may be performed in any suitable order without departing from the scope of the present disclosure. While discussed as controller 128 performing the steps, any suitable component of HVAC system 100 may perform one or more of the steps.

FIG. 12 illustrates a flowchart describing an example of managing lubricant levels in a multi-compressor assembly of an HVAC system when compressor 128 operates in the first mode. At step 1202, in some embodiments, controller 128 determines whether there is an open tandem assembly in the HVAC system. An open tandem assembly may be a tandem compressor assembly in which both individual compressors are off (i.e., not running) and there are no fault conditions (e.g., high pressure switch trip, low pressure switch trip, high compressor temperature overload). Controller 128 may determine which compressors are currently on (e.g., running) to determine which tandem compressors assemblies are not open. If there is a tandem compressor assembly where both the first compressor (e.g., compressor 112) and the second compressor (e.g., compressor 114) are both in an off position, then controller 128 may determine that this tandem compressor assembly is an open tandem assembly. If at step 1202, controller 128 determines that there is an open tandem assembly in the HVAC system, the method continues to step 1204. At step 1204, controller 128 changes the open tandem assembly determined in step 1202 to a partial load. For example, controller 128 may turn on the first compressor 112 of the open tandem assembly or may turn on second compressor 114 of the open tandem assembly. If, at step 1202, controller 128 determines that there is not an open tandem assembly the method continues to step 1206.

At step 1206, in some embodiments, controller 128 determines whether there is a part load tandem compressor assembly in the HVAC system. For example, controller 128 may determine which individual compressors 112, 114, 115, and 113 of the HVAC system are currently running (e.g., on) and which ones are currently not running (e.g., off). If controller 128 determines that one of the tandem compressors (e.g., 101, 102) have one compressor in the on position and one compressor in the off position, then it may determine that it is a part load tandem compressor assembly. If controller 128 determines at step 1206 that there is not a part load tandem compressor assembly in the HVAC system, then at step 1208 controller 128 sends an alert that HVAC system is running at a maximum load and the method ends. If, at step 1206, controller 128 determines there is a part load tandem compressor assembly in the HVAC system, the method continues to step 1210.

At step 1210, in some embodiments, controller 128 determines whether the idle compressor (e.g., the compressor that is off or not currently running) of the part load tandem assembly identified in step 1206 has a compressor sump super heat above a second threshold. A second threshold may be, for example, 20 degrees Fahrenheit, or any temperature within a range of approximately 18 degrees Fahrenheit to 22 degrees Fahrenheit. If, at step 1210, controller 128 determines that the idle compressor has a compressor sump super heat above the second threshold, then at step 1212, controller 128 turns on the idle compressor of the part load tandem assembly. Because the compressor sump super heat is above the second threshold, there is a reduced risk that the compressor is not sufficiently lubricated, as such, controller 128 can turn on the idle compressor, thereby switching the compressor from part load directly to full load with minimal risk of damage or failure of the compressor. If, at step 1210, controller 128 determines that the idle compressor of the part load tandem assembly has a compressor sump super heat below the second threshold, the method continues to step 1214.

At step 1214, in some embodiments, controller 128 determines whether there is another part load tandem assembly with an idle compressor having a compressor sump super heat above the second threshold. For example, if the HVAC system has two tandem compressor assemblies running at part load where the idle compressor from the first part load tandem assembly has a compressor sump super heat of 15 degrees Fahrenheit and the second part load tandem assembly has an idle compressor with a compressor sump super heat of 22 degrees Fahrenheit, then controller 128 may determine that there is another part load tandem assembly with an idle compressor having compressor sump super heat above the second threshold. If controller 128 determines this at step 1214, then at step 1216 controller 128 turns on the idle compressor of the other part load tandem assembly and the method ends. If, at step 1214, controller 128 determines that there is not another part load tandem assembly with an idle compressor having a compressor sump super heat above a second threshold, the method continues to step 1218.

In some embodiments, controller 128 performs steps 1218-1226 in order to further protect compressors 112, 114, 115, and 113 from any damage. When controller 128 changes tandem compressor assemblies 101 or 102 from a partial load operation to a full load operation, controller 128 may engage in a specific sequence to ensure there is an oil balance between compressors 112 and 114 or between compressors 115 and 113 before starting both compressors.

At step 1218, in some embodiments, controller 128 turns off the running compressor of the part load tandem assembly determined at step 1206. At step 1220, in some embodiments, controller 128 turns on an auxiliary compressor to maintain the current cooling capacity while the previously running compressor of the part load tandem assembly is off. At step 1222, in some embodiments, controller 128 determines whether the compressor of the part load tandem assembly has been off for a minimum amount of time. The minimum off time may be, for example, a range of between sixty seconds and five minutes. In some embodiments, controller 128 allows the first compressors to remain off for the minimum off time to ensure that the lubrication oil in compressors are able to redistribute after migrating while only one compressor was on. The minimum off time may prevent damage or failure to compressors by ensuring the lubrication oil is evenly distributed before turning on both compressors. While the running compressor of the part load tandem assembly is off, the auxiliary compressor may be running to ensure that the current cooling demand is met by maintaining the cooling capacity. If at step 1222 controller 128 determines that the compressor has not been off for a minimum time, the controller continues to wait. Once controller 128 determines at step 1222 that the compressor has been off for a minimum amount of time, controller 128 turns off the auxiliary compressor at step 1224 and turns on both compressors of the part load tandem assembly at step 1226. After this, the method ends.

Modifications, additions, or omissions may be made to the methods described in FIG. 12 without departing from the scope of the disclosure. For example, the steps may be combined, modified, or deleted where appropriate, and additional steps may be added. For example, if controller 128 determines that there is a part load tandem compressor assembly with an idle compressor having a compressor sump superheat above a second threshold, then steps 1218-1226 may be omitted. As another example, the system may not include an auxiliary compressor and thus steps 1220 and 1224 may be omitted. Additionally, the steps may be performed in any suitable order without departing from the scope of the present disclosure. While discussed as controller 128 performing the steps, any suitable component of HVAC system 100 may perform one or more of the steps.

FIG. 13 illustrates a flowchart describing an example of managing lubricant levels in a multi-compressor assembly of an HVAC system, when compressor 128 operates in the second mode. At step 1302, in some embodiments, controller 128 determines a number of open tandem compressor assemblies (e.g., tandem assemblies with both compressors off and there are no fault conditions). In some embodiments, controller 128 determines which tandem assemblies are open using one or more techniques discussed above with respect to step 1202 of FIG. 12. Controller 128 then counts the number of open tandem compressor assemblies in a system.

At step 1304, in some embodiments, controller 128 determines whether the number of open tandem compressor assemblies in the HVAC system is more than one. If controller 128 determines there is more than one open tandem compressor assemblies, then at step 1306 controller 128 turns on one compressor of one of the open tandem compressor assemblies in the HVAC system and the method ends. If, at step 1304, controller 128 determines that the number of open tandem compressor assemblies is not more than one, the method continues to step 1308.

At step 1308, in some embodiments, controller 128 determines whether the number of open tandem assemblies equals one. If controller 128 determines there is one open tandem assembly in the HVAC system, then at step 1310 controller 128 turns on both compressors of the one open tandem assembly. Controller 128 then determines whether there are any part load tandem assemblies at step 1312. In certain embodiments, step 1312 can be performed using one or more of the techniques discussed above with respect to step 1206 of FIG. 12 to determine whether there are any part load tandem assemblies in the HVAC system. If controller 128 determines there are no part load tandem assemblies in the HVAC system, then the method ends. If controller 128 determines that there are part load tandem assemblies in step 1312, then at step 1314 controller 128 turns off the running compressor of one of the part load tandem assemblies in the HVAC system. After this the method ends. If at step 1308, controller 128 determines the number of open tandem assemblies in the HVAC system does not equal 1, the method continues to step 1316.

At step 1316, in some embodiments, controller 128 determines whether the number of open tandem assemblies in the HVAC system is zero. If the number of open tandem compressors is not zero, then the method continues to step 1317 where it delivers an error message and method ends. If the number of open tandem assemblies is zero (e.g., all tandem assemblies in HVAC system 1000 have at least one compressor running and/or have fault conditions), then at step 1318, controller 128 determines whether there are any part load tandem assemblies. In certain embodiments, step 1318 can be performed using one or more of the techniques discussed above with respect to step 1312 and/or step 1206 of FIG. 12 to determine whether there are any part load tandem assemblies in the HVAC system. If controller 128 determines there are no part load tandem assemblies at step 1318, the method ends. If controller 128 determines that there are part load tandem assemblies at step 1328, the method continues to step 1320.

In some embodiments, controller 128 performs steps 1320-1328 in order to further protect compressors 112, 114, 115, and 113 from any damage. When controller 128 changes tandem compressor assembly 101 or 102 from a partial load operation to a full load operation, controller 128 may engage in a specific sequence to ensure there is an oil balance between compressors 112 and 114 or between compressors 115 and 113 before starting both compressors.

At step 1320 in some embodiments, controller 128 turns off the running compressor of the part load tandem assembly determined in step 1318. Controller 128 may then turn on the auxiliary compressor at step 1322 and determine whether the running compressor turned off in step 1320 has been off for a minimum time at step 1324. If controller 128 determines the compressor has not been off for a minimum time it continues to wait. Once controller 128 determines a compressor has been off for a minimum time, then the controller 128 turns off the auxiliary compressor at step 1326 and turns on both compressors of the part load tandem assembly determined at step 1318. In certain embodiments, steps 1320-1328 can be performed using one or more of the techniques discussed above with respect to steps 1218-1226 of FIG. 12. After turning on both compressors of the part load tandem assembly in step 1328, to insure the temperature demand is satisfied, the method ends.

Modifications, additions, or omissions may be made to the methods described in FIG. 13 without departing from the scope of the disclosure. For example, the steps may be combined, modified, or deleted where appropriate, and additional steps may be added. For example, if controller 128 determines that there are no part load tandem assemblies at step 1312, then step 1314 may be omitted. As another example, the system may not include an auxiliary compressor and thus steps 1322 and 1326 may be omitted. Additionally, the steps may be performed in any suitable order without departing from the scope of the present disclosure. While discussed as controller 128 performing the steps, any suitable component of HVAC system 100 may perform one or more of the steps.

FIGS. 14A, 14B, 14C, and 14D illustrate tables showing compressor switching operations of a six-stage and seven-stage HVAC system having a plurality of tandem compressor assemblies. Each table shows a cooling demand ranging from Y1-Y7, each successively calling for the HVAC system to provide a higher cooling capacity to meet an increasing load demand. In some embodiments, tandem compressor circuit assemblies (CIR 1, CIR 2, and CIR 3) may comprise the first compressor assembly 101 and the second compressor 102 assembly of the first HVAC system 1000 shown in FIGS. 1 and 2. Although the system shows three compressor circuits, the HVAC system can have any number of tandem compressor circuit assemblies.

FIG. 14A illustrates a table showing compressor switching operations of a plurality of tandem compressor assemblies when controller 128 operates in a second mode (e.g., when the ambient air temperature is below a threshold of about 60 degrees Fahrenheit). For example, when switching from demand Y3 (three compressors on) to demand Y4 (four compressors on), controller 128 turns off the partial load tandem assembly CIR1 and turns on both compressors of CIR2 that was previously running a zero load. This prevents CIR1 from having to switch directly from a partial load to a full load (e.g., if controller had turned on the second compressor of CIR1) and allows the compressors of CIR1 to balance the lubrication oil between them. Turning CIR1 down to a zero state for the duration of Y4 allows CIR1 to be considered an open circuit (provided there are no fault conditions) in method 1200 and method 1300. This allows CIR1 to be available to switch from a zero load to a partial load or a zero load to a full load when switching from Y4 to Y5.

FIG. 14B illustrates a table showing compressor switching operations of a plurality of tandem compressors when controller 128 operates in a first mode (e.g., when the ambient air temperature is above a threshold of about 60 degrees Fahrenheit) and all the compressors have a high compressor sump superheat. For example, when switching from demand Y3 (three compressors on) to demand Y4 (four compressors on), controller 128 simply turn on previously idle compressor of CIR1 so that there are four compressors running during demand Y4. Unlike the switching operation shown in FIG. 14B, controller 128 does not engage in an equalization period or off time when switching a tandem compressor assembly from a partial load to a full load. Because the compressor sump superheat is above a threshold of about 20 degrees Fahrenheit, there is minimal risk of damage or failure to either compressor of CIR1. Thus, controller 128 operates in the most efficient manner by switching directly from Y3 to Y4.

FIG. 14C illustrates a table showing compressor switching operations of a plurality of tandem compressors when controller 128 operates in a first mode (e.g., when the ambient air temperature is above a threshold of about 60 degrees Fahrenheit) and all the compressors have low compressor sump superheat. For example, when switching from demand Y3 (three compressors on) to demand Y4 (four compressors on), controller 128 engages in an equalization period Y3*. By switching off the first compressor of CIR1 at Y3* (that was previously on during Y3) and waiting for a certain off time, controller 128 ensures that the lubrication oil in the first and second compressors of CIR1 are able to redistribute after migrating as a result of the first compressor being on while the second compressor was off. This off time may prevent damage or failure to the first and second compressors of CIR1 by ensuring the lubrication oil is evenly distributed. After the first and second compressors of CIR1 are off for a minimum off time, controller 128 may turn on both compressors to meet the Y4 demand.

FIG. 14D illustrates a table showing compressor switching operations of a plurality of tandem compressors when controller 128 operates in a first mode (e.g., when the ambient air temperature is above a threshold of about 60 degrees Fahrenheit) and all the compressors have low compressor sump superheat. The conditions are similar to those presented for FIG. 14C, except the HVAC system used for FIG. 14D includes an auxiliary compressor. Thus, when switching from demand Y3 to demand Y4 and while controller 128 is engaging in an equalization period Y3*, controller 128 turns on the auxiliary compressor. By turning on the auxiliary compressor during the equalization period, the HVAC system continues to have three compressors running and thus continues to meet the current demand on the HVAC system. Thus, controller 128 ensures that the lubrication oil in the first and second compressors of CIR1 are able to redistribute after migrating as a result of the first compressor being on while the second compressor was off and ensures that the current demand is still met through the auxiliary compressor. This may provide for greater customer comfort and still reduces the risk of damage or failure to the compressors.

Modifications, additions, or omissions may be made to the systems described herein without departing from the scope of the disclosure. For example, although FIGS. 14A-D illustrate three tandem compressor assemblies with two compressors each and illustrate one auxiliary compressor, the HVAC system may include any number of tandem compressor assemblies and any number of auxiliary compressors. The components may be integrated or separated. Moreover, the operations may be performed by more, fewer, or other components. Additionally, the operations may be performed using any suitable logic comprising software, hardware, and/or other logic.

The invention claimed is:

1. A heating, ventilation, and air-conditioning (HVAC) system, comprising:
    a plurality of sensors;
    a plurality of tandem compressor assemblies, each tandem compressor assembly comprising a first compressor and a second compressor;
    an auxiliary compressor, the auxiliary compressor comprising a single compressor circuit; and
    a controller communicatively coupled to the plurality of sensors and the plurality of tandem compressor assemblies, the controller operable to:
        determine an increase in a cooling demand of a structure associated with the HVAC system based on data received from at least one of the plurality of sensors;
        compare an ambient temperature outside of the structure to a first threshold;

in response to determining that the ambient temperature is greater than the first threshold:
  determine whether one of the plurality of tandem compressor assemblies comprises an open tandem assembly, the open tandem assembly comprising the first compressor in an off position and the second compressor in an off position;
  in response to determining that one of the plurality of tandem compressor assemblies comprises the open tandem assembly, turn on the first compressor of the open tandem assembly;
  in response to determining that one of the plurality of tandem compressor assemblies does not comprise the open tandem assembly:
    determine that one of the plurality of tandem compressor assemblies comprises a part load tandem assembly, the part load tandem assembly comprising the first compressor in an on position and the second compressor in an off position;
    determine a compressor sump superheat of the second compressor of the part load tandem assembly;
    compare the compressor sump superheat of the second compressor of the part load tandem assembly to a compressor sump superheat threshold;
    in response to determining that the compressor sump superheat of the second compressor of the part load tandem assembly is greater than the compressor sump superheat threshold, turn on the second compressor; and
    in response to determining that the compressor sump superheat of the second compressor of the part load tandem assembly is less than the compressor sump superheat threshold:
      turn off the first compressor of the part load tandem assembly;
      turn on the auxiliary compressor;
      determine that the first compressor of the part load tandem assembly has been off for a minimum time;
      turn off the auxiliary compressor;
      turn on the first compressor of the part load tandem assembly; and
      turn on the second compressor of the part load tandem assembly; and
in response to determining that the ambient temperature is less than the first threshold:
  determine a number of open tandem assemblies of the plurality of tandem compressor assemblies;
  in response to determining the number of open tandem assemblies is more than one, turn on the first compressor of one of the open tandem assemblies;
  in response to determining the number of open tandem assemblies is one:
    turn on the first compressor and the second compressor of the open tandem assembly;
    determine that one of the plurality of tandem compressor assemblies comprises the part load tandem assembly; and
    turn off the first compressor,
  in response to determining the number of open tandem assemblies is zero:
    determine that one of the plurality of tandem compressor assemblies comprises the part load tandem assembly;
    turn off the first compressor of the part load tandem assembly;
    turn on the auxiliary compressor,
    determine that the first compressor of the part load tandem assembly has been off for a minimum time;
    turn off the auxiliary compressor;
    turn on the first compressor of the part load tandem assembly; and
    turn on the second compressor of the part load tandem assembly.

2. A heating, ventilation, and air-conditioning (HVAC) system, comprising:
  a plurality of sensors;
  a plurality of tandem compressor assemblies, each tandem assembly comprising a first compressor and a second compressor, and
  a controller communicatively coupled to the plurality of sensors and the plurality of tandem compressor assemblies, the controller operable to:
    determine an increase in a cooling demand of a structure associated with the HVAC system based on data received from at least one of the plurality of sensors;
    compare an ambient temperature outside of the structure to a first threshold;
    in response to determining that the ambient temperature is greater than the first threshold, operate the HVAC system in a first mode, wherein when operating in the first mode, the controller is operable to:
      determine whether one of the plurality of tandem compressor assemblies comprises an open tandem assembly, the one tandem assembly comprising the first compressor in an off position and the second compressor in an off position;
      in response to determining that one of the plurality of tandem compressor assemblies comprises the open tandem assembly, turn on the first compressor of the open tandem assembly;
      in response to determining that one of the plurality of tandem compressor assemblies does not comprise the open tandem assembly:
        determine that one of the plurality of tandem compressor assemblies comprises a first part load tandem assembly, the first part load tandem assembly comprising the first compressor in an on position and the second compressor in an off position;
        determine a compressor sump superheat of the second compressor of the first part load tandem assembly;
        compare the compressor sump superheat of the second compressor of the first ort load tandem assembly to a compressor sump superheat threshold;
        in response to determining that the compressor sump superheat of the second compressor of the first part load tandem assembly is greater than the compressor sump superheat threshold, turn on the second compressor; and
        in response to determining that the compressor sump superheat of the second compressor of the first part load tandem assembly is less than the compressor sump superheat threshold:
          turn off the first compressor of the first part load tandem assembly;

determine that the first compressor of the first part load tandem assembly has been off for a minimum time;
turn on the first compressor of the first part load tandem assembly;
turn on the second compressor of the first part load tandem assembly; and
in response to determining that the ambient temperature is less than the first threshold, operate the HVAC system in a second mode.

3. The system of claim 2, wherein when operating in the first mode, the controller is further operable to:
in response to determining that the compressor sump superheat of the second compressor of the part load tandem assembly is less than the compressor sump superheat threshold:
determine that one of the plurality of tandem compressor assemblies comprises a second part load tandem assembly, the second part load tandem assembly comprising the first compressor in an on position and the second compressor in an off position, a compressor sump superheat of the second compressor being greater than the compressor sump superheat threshold; and
in response to determining that one of the plurality of tandem compressor assemblies comprises the second part load tandem assembly, turn on the second compressor of the second part load tandem assembly.

4. The system of claim 2, further comprising an auxiliary compressor, the auxiliary compressor comprising a single compressor circuit, and wherein when operating in the first mode, the controller is further operable to:
in response to determining that the compressor sump superheat of the second compressor of the part load tandem assembly is less than the compressor sump superheat threshold, turn on the auxiliary compressor; and
in response to turning on the first compressor of the part load tandem assembly, turn off the auxiliary compressor.

5. The system of claim 2, wherein when operating in the second mode, the controller is further operable to:
determine a number of open tandem assemblies of the plurality of tandem compressor assemblies, an open tandem assembly comprising the first compressor in an off position and the second compressor in an off position;
in response to determining the number of open tandem assemblies is more than one, turn on the first compressor of one of the open tandem assemblies;
in response to determining the number of open tandem compressor assemblies is one:
turn on the first compressor and the second compressor of the open tandem assembly;
determine that one of the plurality of tandem compressor assemblies comprises the part load tandem assembly; and
turn off the first compressor;
in response to determining the number of open tandem assemblies is zero:
determine that one of the plurality of tandem compressor assemblies comprises the part load tandem assembly;
turn off the first compressor of the part load tandem assembly;
determine that the first compressor of the part load tandem assembly has been off for a minimum time;
turn on the first compressor of the part load tandem assembly; and
turn on the second compressor of the part load tandem assembly.

6. The system of claim 5, further comprising an auxiliary compressor, the auxiliary compressor comprising a single compressor circuit; and wherein when operating in the second mode, the controller is further operable to:
in response to determining that one of the plurality of tandem compressor assemblies comprises the part load tandem assembly and turning off the first compressor of the part load tandem assembly, turn on the auxiliary compressor; and
in response to determining that the first compressor of the part load tandem assembly has been off for a minimum time, turn off the auxiliary compressor.

7. A controller for operating a heating, ventilation, and air-conditioning (HVAC) system, comprising:
a memory; and
a processor communicatively coupled to the memory, the processor operable to:
determine an increase in a temperature demand of a structure associated with the HVAC system based on data received from at least one of a plurality of sensors;
compare an ambient temperature outside of the structure to a first threshold;
in response to determining that the ambient temperature is greater than the first threshold, operate the HVAC system in a first mode, the HVAC system comprising a plurality of tandem compressor assemblies, each tandem compressor assembly comprising a first compressor and a second compressor, wherein when operating in the first mode, the controller is operable to:
determine whether one of the plurality of tandem compressor assemblies comprises an open tandem assembly, the open tandem assembly comprising the first compressor in an off position and the second compressor in an off position;
in response to determining that one of the plurality of tandem compressor assemblies comprises the open tandem assembly, turn on the first compressor of the open tandem assembly;
in response to determining that one of the plurality of tandem compressor assemblies does not comprise the open tandem assembly:
determine that one of the plurality of tandem compressor assemblies comprises a first part load tandem assembly, the first part load tandem assembly comprising the first compressor in an on position and the second compressor in an off position;
determine a compressor sump superheat of the second compressor of the first part load tandem assembly;
compare the compressor sump superheat of the second compressor of the first part load tandem assembly to a compressor sump superheat threshold;
in response to determining that the compressor sump superheat of the second compressor of the first part load tandem assembly is greater than the compressor sump superheat threshold, turn on the second compressor; and
in response to determining that the compressor sump superheat of the second compressor of the first art load tandem assembly is less than the compressor sump superheat threshold:
turn off the first compressor of the first part load tandem assembly;
determine that the first compressor of the first part load tandem assembly has been off for a minimum time;
turn on the first compressor of the first part load tandem assembly;
turn on the second compressor of the first part load tandem assembly; and
in response to determining that the ambient temperature is less than the first threshold, operate the HVAC system in a second mode.

8. The controller of claim 7, wherein when operating in the first mode, the controller is further operable to:
in response to determining that the compressor sump superheat of the second compressor of the part load tandem assembly is less than the compressor sump superheat threshold:
determine that one of the plurality of tandem compressor assemblies comprises a second part load tandem assembly, the second part load tandem assembly comprising the first compressor in an on position and the second compressor in an off position, a compressor sump superheat of the second compressor being greater than the compressor sump superheat threshold; and
in response to determining that one of the plurality of tandem compressor assemblies comprises the second part load tandem assembly, turn on the second compressor of the second part load tandem assembly.

9. The controller of claim 7, wherein the HVAC system further comprises an auxiliary compressor, the auxiliary compressor comprising a single compressor circuit, and wherein when operating in the first mode, the controller is further operable to:
in response to determining that the compressor sump superheat of the second compressor of the part load tandem assembly is less than the compressor sump superheat threshold, turn on the auxiliary compressor; and
in response to turning on the first compressor of the part load tandem assembly, turn off the auxiliary compressor.

10. The controller of claim 7, wherein when operating in the second mode, the controller is further operable to:
determine a number of open tandem assemblies of the plurality of tandem compressor assemblies, an open tandem assembly comprising the first compressor in an off position and the second compressor in an off position;
in response to determining the number of open tandem assemblies is more than one, turn on the first compressor of one of the open tandem assemblies;
in response to determining the number of open tandem assemblies is one:
turn on the first compressor and the second compressor of the open tandem assembly;
determine that one of the plurality of tandem compressor assemblies comprises the part load tandem assembly; and
turn off the first compressor,
in response to determining the number of open tandem assemblies is zero:
determine that one of the plurality of tandem compressor assemblies comprises the part load tandem assembly;
turn off the first compressor of the part load tandem assembly;
determine that the first compressor of the part load tandem assembly has been off for a minimum time;
turn on the first compressor of the part load tandem assembly; and
turn on the second compressor of the part load tandem assembly.

11. The controller of claim 10, wherein the HVAC system further comprises an auxiliary compressor, the auxiliary compressor comprising a single compressor circuit; and wherein when operating in the second mode, the controller is further operable to:
in response to determining that one of the plurality of tandem compressor assemblies comprises the part load tandem assembly and turning off the first compressor of the part load tandem assembly, turn on the auxiliary compressor; and
in response to determining that the first compressor of the part load tandem assembly has been off for a minimum time, turn off the auxiliary compressor.

12. A non-transitory computer readable storage medium comprising instructions, the instructions, when executed by a processor, executable to:
determine an increase in a cooling demand of a structure associated with the HVAC system based on data received from at least one of a plurality of sensors;
compare an ambient temperature outside of the structure to a first threshold;
in response to determining that the ambient temperature is greater than the first threshold, operate the HVAC system in a first mode, the HVAC system comprising a plurality of tandem compressor assemblies, each tandem compressor assembly comprising a first compressor and a second and compressor, wherein when operating in the first mode, the controller is operable to:
determine whether one of the plurality of tandem compressor assemblies comprises an open tandem assembly, the open tandem assembly comprising the first compressor in an off position and the second compressor in an off position;
in response to determining that one of the plurality of tandem compressor assemblies comprise the open tandem assembly, turn on the first compressor of the open tandem assembly;
in response to determining that one of the plurality of tandem compressor assemblies does not comprise the open tandem assembly:
determine that one of the plurality of tandem compressor assemblies comprises a first part load tandem assembly, the first part load tandem assembly comprising the first compressor in an on position and the second compressor in an off position;
determine a compressor sump superheat of the second compressor of the first part load tandem assembly;
compare the compressor sump superheat of the second compressor of the first part load tandem assembly to a compressor sump superheat threshold;
in response to determining that the compressor sump superheat of the second compressor of the first part load tandem assembly is greater than the compressor sump superheat threshold, turn on the second compressor; and in response to determining that the compressor sump superheat of the second compressor of the first part load tandem assembly is less than the compressor sump superheat threshold:

turn off the first compressor of the first part load tandem assembly;

determine that the first compressor of the first part load tandem assembly has been off for a minimum time;

turn on the first compressor of the first part load tandem assembly;

turn on the second compressor of the first par load tandem assembly; and in response to determining that the ambient temperature is less than the first threshold, operate the HVAC system in a second mode.

13. The non-transitory computer readable storage medium of claim 12, wherein the instructions are further operable to:

in response to determining that the compressor sump superheat of the second compressor of the part load tandem assembly is less than the compressor sump superheat threshold:

determine that one of the plurality of tandem compressor assemblies comprises a second part load tandem assembly, the second part load tandem assembly comprising the first compressor in an on position and the second compressor in an off position, a compressor sump superheat of the second compressor being greater than the compressor sump superheat threshold; and in response to determining that one of the plurality of tandem compressor assemblies comprises the second part load tandem assembly, turn on the second compressor of the second part load tandem assembly.

14. The non-transitory computer readable storage medium of claim 13, wherein the HVAC system further comprises an auxiliary compressor, the auxiliary compressor comprising a single compressor circuit and wherein when operating in the first mode, the instructions are further operable to:

in response to determining that the compressor sump superheat of the second compressor of the part load tandem assembly is less than the compressor sump superheat threshold, turn on the auxiliary compressor; and in response to turning on the first compressor of the part load tandem assembly, turn off the auxiliary compressor.

15. The non-transitory computer readable storage medium of claim 12, wherein when operating in the second mode, the instructions are further operable to:

determine a number of open tandem assemblies of the plurality of tandem compressor assemblies, an open tandem assembly comprising the first compressor in an off position and the second compressor in an off position;

in response to determining the number of open tandem assemblies is more than one, turn on the first compressor of one of the open tandem assemblies;

in response to determining the number of open tandem assemblies is one:

turn on the first compressor and the second compressor of the open tandem assembly;

determine that one of the plurality of tandem compressor assemblies comprises the part load tandem assembly; and turn off the first compressor;

in response to determining the number of open tandem assemblies is zero:

determine that one of the plurality of tandem compressor assemblies comprises the part load tandem assembly;

turn off the first compressor of the part load tandem assembly;

determine that the first compressor of the part load tandem assembly has been off for a minimum time;

turn on the first compressor of the part load tandem assembly; and turn on the second compressor of the part load tandem assembly.

16. The non-transitory computer readable storage medium of claim 15, wherein the HVAC system further comprises an auxiliary compressor, the auxiliary compressor comprising a single compressor circuit; and wherein when operating in the second mode, the controller is further operable to:

in response to determining that one of the plurality of tandem compressor assemblies comprises the part load tandem assembly and turning off the first compressor of the part load tandem assembly, turn on the auxiliary compressor; and in response to determining that the first compressor of the part load tandem assembly has been off for a minimum time, turn off the auxiliary compressor.

* * * * *